(12) United States Patent
Ezoe

(10) Patent No.: US 9,811,292 B2
(45) Date of Patent: Nov. 7, 2017

(54) USING IMAGE DIFFERENCE DATA TO REDUCE DATA PROCESSING

(71) Applicant: Seiko Epson Corporation, Tokyo (JP)

(72) Inventor: Takashi Ezoe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/474,874

(22) Filed: Sep. 2, 2014

(65) Prior Publication Data

US 2015/0077794 A1    Mar. 19, 2015

(30) Foreign Application Priority Data

Sep. 6, 2013    (JP) .................................. 2013-184768
Mar. 28, 2014   (JP) .................................. 2014-068254

(51) Int. Cl.
   *G06F 3/12*    (2006.01)
(52) U.S. Cl.
   CPC ............ *G06F 3/1224* (2013.01); *G06F 3/122* (2013.01); *G06F 3/1244* (2013.01); *G06F 3/1284* (2013.01)
(58) Field of Classification Search
   CPC .... G06F 3/1224; G06F 3/1284; G06F 3/1244; G06F 3/122; H04N 1/41
   See application file for complete search history.

(56) References Cited

U.S. PATENT DOCUMENTS

| 2007/0133907 | A1* | 6/2007 | Yamamoto | G06K 9/00463 382/305 |
| 2008/0292189 | A1* | 11/2008 | Morimoto | G06K 9/6211 382/181 |
| 2009/0002762 | A1 | 1/2009 | Sakamoto et al. | |
| 2009/0316228 | A1* | 12/2009 | Matsushita | H04N 1/40062 358/474 |
| 2010/0060935 | A1* | 3/2010 | Nakao | G06F 3/1215 358/1.18 |

FOREIGN PATENT DOCUMENTS

| JP | 11-031153 | | 2/1999 |
| JP | 11031153 | A * | 2/1999 |
| JP | 2006-011809 | | 1/2006 |
| JP | 2007-025073 | A | 2/2007 |
| JP | 2008-301476 | | 12/2008 |
| JP | 2009-010770 | A | 1/2009 |
| JP | 2010-109637 | A | 5/2010 |
| JP | 2010-237936 | | 10/2010 |
| JP | 2012-044478 | | 3/2012 |
| JP | 2012044478 | A * | 3/2012 |
| JP | 2013-123118 | A | 6/2013 |
| JP | 2014-026372 | | 2/2014 |

* cited by examiner

*Primary Examiner* — Andrew H Lam
(74) *Attorney, Agent, or Firm* — Foley & Lardner LLP

(57) ABSTRACT

The amount of data transmitted is reduced and processing is accelerated in a process that uses image difference data to reduce the amount of data. A host computer 1 segments a first image and a second image into corresponding rectangular cells each containing plural pixels, compares the first image and the second image and identifies corresponding cells that differ, and extracts the identified cells. The host computer 1 then combines plural extracted cells into rectangular units, and outputs image difference data based on the generated units to a printer 5.

7 Claims, 19 Drawing Sheets

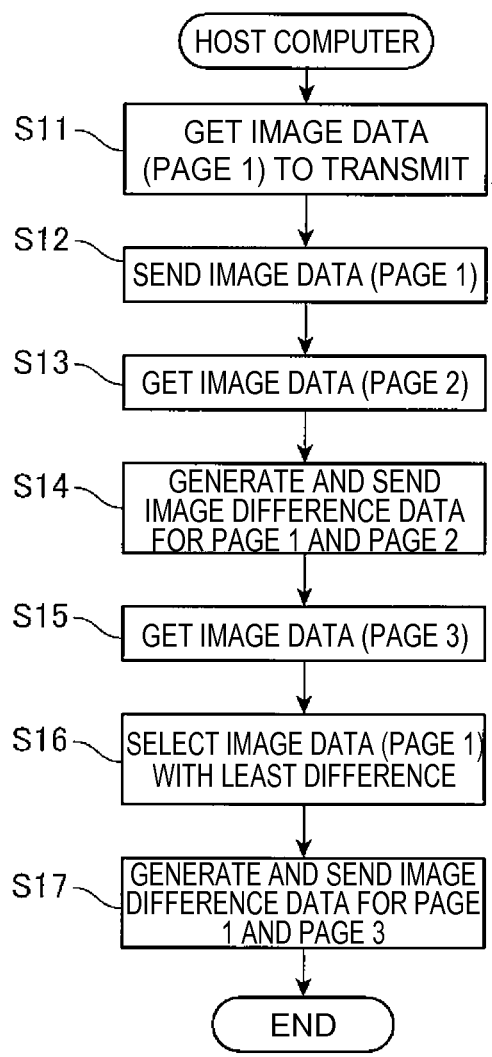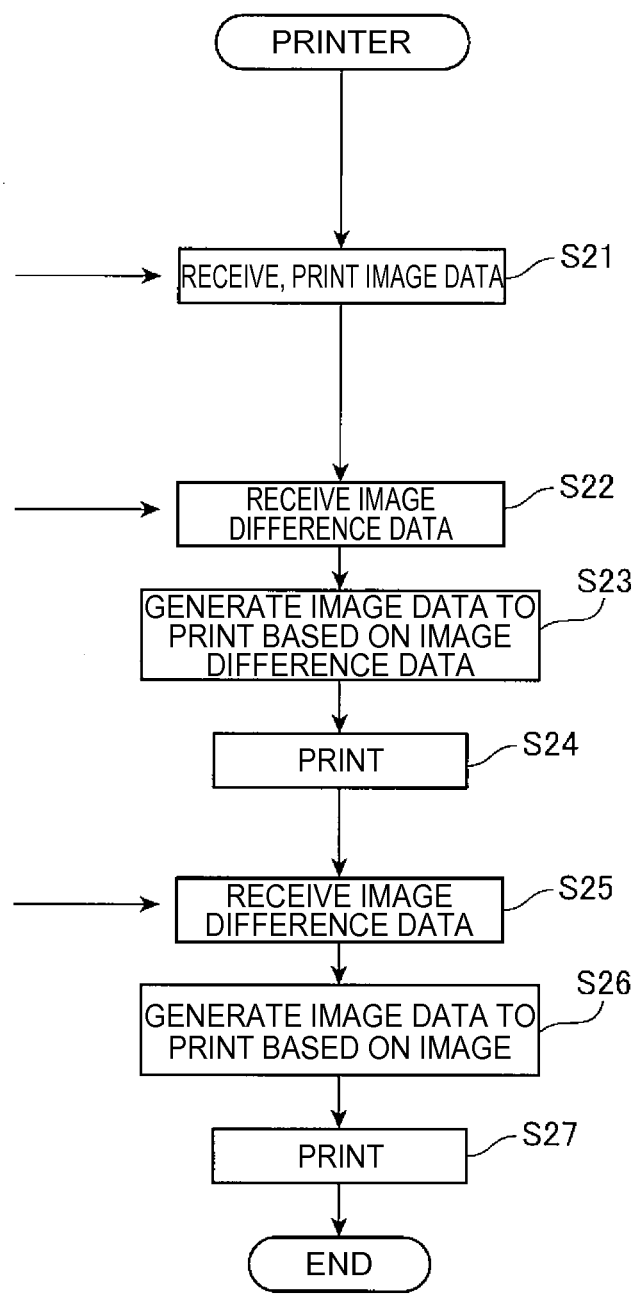

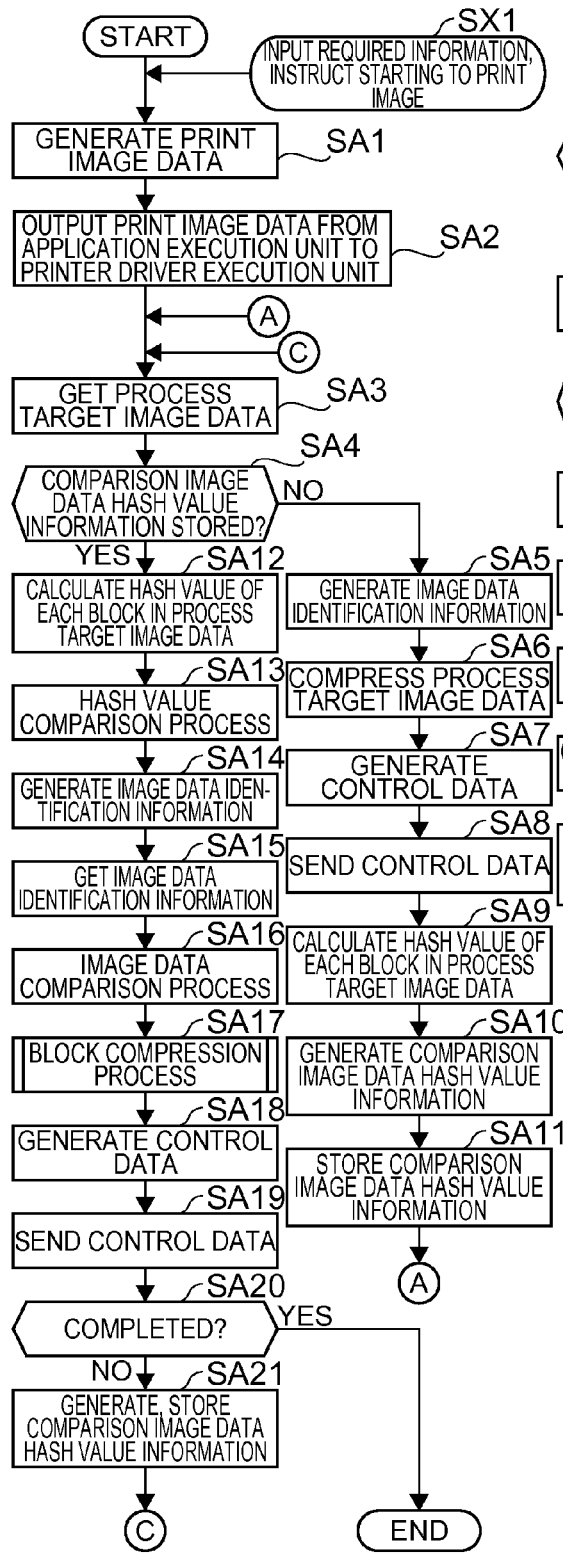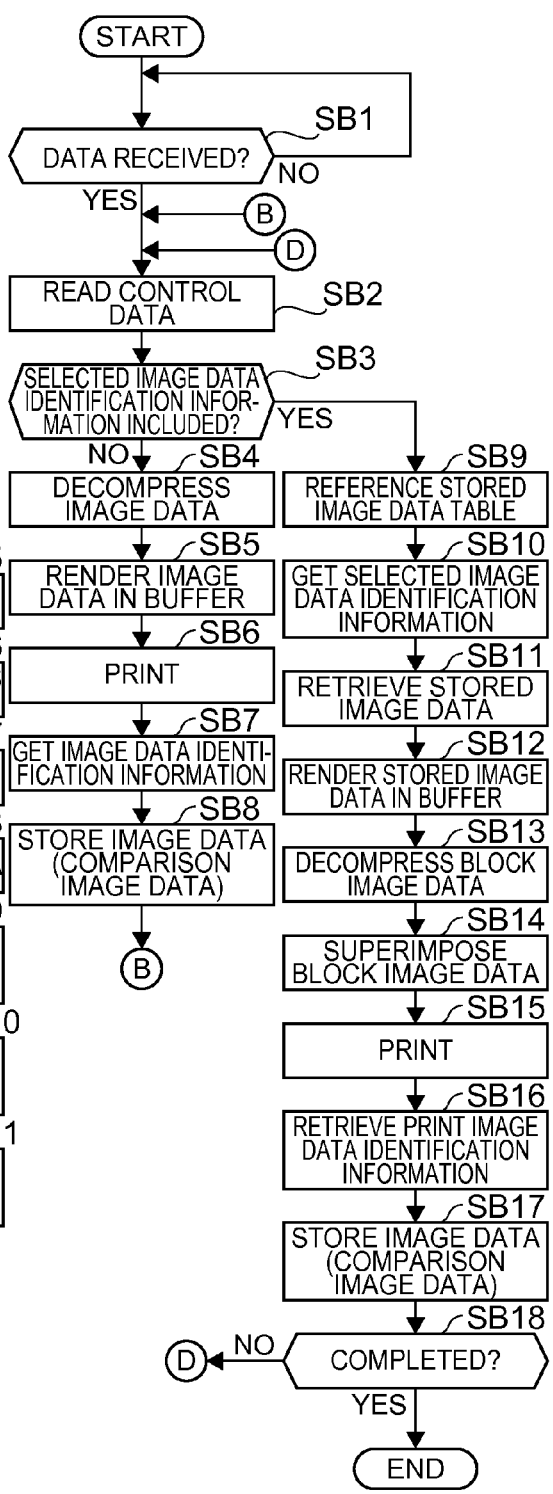

| | MERGING PROCESS CANDIDATES | PRINTER PROCESSING TIME VALUE | REFERENCE DIFFERENCE |
|---|---|---|---|
| CANDIDATE 1 | MERGER OF S4 AND S6 | 61 | -2 |
| CANDIDATE 2 | MERGER OF S3 AND S4 | 62 | -1 |
| CANDIDATE 3 | MERGER OF S3 AND S5 | 62 | -1 |
| CANDIDATE 4 | MERGER OF S4 AND S5 | 62 | -1 |
| CANDIDATE 5 | MERGER OF S5 AND S8 | 62 | -1 |
| CANDIDATE 6 | MERGER OF S8 AND S12 | 62 | -1 |
| CANDIDATE 7 | MERGER OF S10 AND S11 | 62 | -1 |
| CANDIDATE 8 | MERGER OF S13 AND S14 | 62 | -1 |
| CANDIDATE 9 | MERGER OF S15 AND S16 | 62 | -1 |
| CANDIDATE 10 | MERGER OF S2 AND S3 | 63 | ±0 |
| ... | ... | ... | ... |
| CANDIDATE 11 | MERGER OF S6 AND S8 | 64 | +1 |
| ... | ... | ... | ... |

| R1 | R2 | R3 | R4 | R5 | R6 | R7 | R8 | R9 | R10 |
|---|---|---|---|---|---|---|---|---|---|
| R11 | R12 S1 | R13 | R14 | R15 S2 | R16 | R17 S3 | R18 | R19 S17 | R20 |
| R21 | R22 | R23 | R24 | R25 | R26 | R27 | R28 | R29 | R30 |
| R31 | R32 | R33 | R34 | R35 | R36 | R37 | R38 | R39 | R40 |
| R41 | R42 | R43 S7 | R44 | R45 | R46 | R47 | R48 | R49 | R50 S8 |
| R51 | R52 | R53 | R54 | R55 | R56 | R57 S9 | R58 | R59 | R60 |
| R61 | R62 | R63 | R64 | R65 | R66 | R67 | R68 | R69 | R70 |
| R71 | R72 | R73 | R74 S10 | R75 | R76 | R77 S11 | R78 | R79 | R80 S12 |
| R81 | R82 | R83 S13 | R84 | R85 | R86 | R87 | R88 | R89 | R90 |
| R91 | R92 S14 | R93 | R94 | R95 | R96 S15 | R97 | R98 S16 | R99 | R100 |

FIG. 19(B)

| R1 | R2 | R3 | R4 | R5 | R6 | R7 | R8 | R9 | R10 |
|---|---|---|---|---|---|---|---|---|---|
| R11 | R12 S1 | R13 | R14 | R15 S2 | R16 | R17 S3 | R18 | R19 S17 | R20 |
| R21 | R22 | R23 | R24 | R25 | R26 | R27 | R28 | R29 | R30 |
| R31 | R32 | R33 | R34 | R35 | R36 | R37 | R38 | R39 | R40 |
| R41 | R42 | R43 S7 | R44 | R45 | R46 | R47 | R48 | R49 | R50 S18 |
| R51 | R52 | R53 | R54 | R55 | R56 | R57 S9 | R58 | R59 | R60 |
| R61 | R62 | R63 | R64 | R65 | R66 | R67 | R68 | R69 | R70 |
| R71 | R72 | R73 | R74 S19 | R75 | R76 | R77 | R78 | R79 | R80 |
| R81 | R82 | R83 S20 | R84 | R85 | R86 | R87 | R88 | R89 | R90 |
| R91 | R92 | R93 | R94 | R95 | R96 | R97 S21 | R98 | R99 | R100 |

# USING IMAGE DIFFERENCE DATA TO REDUCE DATA PROCESSING

Priority is claimed under 35 U.S.C. §119 from Japanese patent application nos. JP 2013-184768 filed on Sep. 6, 2013, JP 2014-068254 filed on Mar. 28, 2014 and JP 2014-161281 filed on Aug. 7, 2014, which are hereby incorporated by reference in their entirety.

BACKGROUND

1. Technical Field

The present disclosure relates to an image processing device, a printing system, and a control method of an image processing device.

2. Related Art

Systems in which a control device (host device) and a printing device (printer) communicate with each other are known from the literature. See, for example, JP-A-2006-11809. To control the printer, the control device generally sends control-related data to the printer. The printer then executes a process based on the data received from the control device.

Methods of using image data that represent the differences between images in order to reduce the amount of data when sending and receiving plural images are also known from the literature. See, for example, JP-A-2012-44478. The method disclosed in JP-A-2012-44478 compares two images, extracts difference rectangles containing a desired number of dots, and obtains a difference image by merging the difference rectangles.

When sending data from the control device to the printer in this type of system, reducing the amount of data that is sent from the control device to the printer is desirable in order to improve communication efficiency.

In the method that extracts rectangles showing the difference between two images as described in JP-A-2012-44478, detailed differences can be extracted with little loss by defining small rectangles, but increasing the number of rectangles increases the total required processing time. Increasing the size of the extracted rectangles reduces the number of rectangles and therefore shortens the processing time, but also increases waste because a large number of dots that do not require difference extraction are contained in the extracted rectangles. The desired effect of reducing the amount of data by extracting the differences between the images is therefore also lost. A method enabling both reducing the amount of data and accelerating processing in a process that uses image difference data to reduce the amount of data is therefore desirable.

SUMMARY

One object of the invention is therefore to provide an image processing device, a printing system, and a control method of an image processing device that reduce the amount of data that is sent from the control device to the printer.

Another object of the invention is to both reduce the amount of data and accelerate processing in a process that uses image difference data to reduce the amount of data.

To achieve the foregoing object, an image processing device according to one aspect of the invention has a comparison unit that segments a first image and a second image into rectangular cells each containing a plurality of pixels, compares the first image and the second image, and identifies corresponding cells that are different; a merging process unit that extracts the cells identified by the comparison unit, combines extracted cells, and generates rectangular units; and an output unit that outputs image difference data for the first and second images based on the units processed by the merging process unit.

In this aspect of the invention matching cells containing pixels that are different in the first image and second image are extracted, combined into larger units, and image difference data is generated based on these units. As a result, the number of pixels in a cell can be increased for faster processing, and both the effect of using image data of the differences to reduce the amount of data, and accelerating processing, can be achieved.

An image processing device according to another aspect of the invention also has a unit processor that executes a process of removing pixels located on the perimeter of the units generated by the merging process unit that match in the first image and the second image as a group equal to a side of the unit; and the output unit outputs image difference data for the first and second images based on the units processed by the unit processor.

This aspect of the invention runs a process that removes pixels that match in the first image and second image from the units obtained by merging cells containing pixels that differ, and outputs image difference data from which matching pixels have been removed. As a result, image difference data with less waste can be output, processing can be made faster, and the amount of data can be effectively reduced.

When plural adjacent units collectively form a rectangle in an image processing device according to another aspect of the invention, the merging process unit combines the plural units to create a larger unit.

This aspect of the invention increases the number of pixels in a unit, and increases the effect of data compression when a process that compresses the image difference data is applied, for example. Furthermore, because the number of units contained in the image difference data can also be reduced, the amount of data needed to identify the position of the unit in the image can be reduced, and the amount of data can be more efficiently reduced.

In an image processing device according to another aspect of the invention, the image difference data output by the output unit includes image data of the units generated by the merging process unit, and data indicating the locations of the units in the printed image. This configuration can efficiently reduce the amount of data in the image difference data.

Further preferably in an image processing device according to another aspect of the invention, the output unit compresses and outputs the image difference data. This configuration can further reduce the amount of data in the image difference data.

An image processing device according to another aspect of the invention preferably also has a storage unit that stores a calculated value computed using a specific equation for a block of comparison image data, which is image data used for comparison. The comparison unit computes a calculated value using the specific equation for each block in the print image data, which is the image data of the image to be printed by the printing device, and compares the calculated values of corresponding blocks in the comparison image data and the print image data; and the output unit sends the image data of a block in the print image data for which the calculated value is different from the calculated value of the corresponding block in the comparison image data to the printing device.

In this aspect of the invention, the image processing device sends the image data of blocks in the print image data of the image to print that have a different calculated value than the corresponding block in the stored comparison image data to the printing device. As a result, by previously storing the comparison image data in the printing device, the printing device can print an image based on the stored comparison image data and the image data from the received blocks. To print an image, the control device can therefore simply send the image data of the blocks in the print image data of the image to be printed that have a calculated value different from the calculated value of the corresponding block in the stored comparison image data to the printing device, and the amount of data the control device sends to the printing device can be reduced.

In an image processing device according to another aspect of the invention, the storage unit stores identification information identifying the comparison image data relationally to the calculated value of a block of the comparison image data for one or a plurality of comparison image data; the comparison unit compares the calculated values of corresponding blocks in the print image data and the one or plurality of comparison image data and selects the comparison image data with the fewest blocks having a different calculated value; and the output unit sends the image data of blocks in the print image data that have a calculated value different from the corresponding block in the selected comparison image data, and identification information for the selected comparison image data, to the printing device.

In this configuration of the invention, the image processing device compares calculated values for corresponding blocks in the print image data and one or a plurality of comparison image data, and determines the comparison image data with the fewest blocks having a different calculated value. Because the comparison image data is selected by this method, the control device can determine the comparison image data closest to the print image data by the simple means of comparing the calculated values of the blocks.

Furthermore, because the comparison image data is selected by this method, the processing load is lighter and the time required to make a decision is shorter than when the closest comparison image data is determined by comparing individual dots in the print image data with individual dots in the comparison image data. This configuration of the invention also enables the image processing device to report the selected image data to the printing device by means of the identification information.

By storing the identification information relationally to the comparison image data, the printing device can identify the comparison image data selected by the image processing device, and can print an image based on the identified comparison image data and the image data of the received blocks.

In an image processing device according to another aspect of the invention, the output unit compresses and sends the image data of the blocks to the printing device.

This configuration of the invention can further reduce the amount of data sent from the image processing device to the printing device.

In an image processing device according to another aspect of the invention, the comparison unit compares blocks formed by segmenting process target image data, which is image data to be processed, and blocks formed by segmenting comparison image data, which is image data used for comparison, and identifies a block of the process target image data containing data content different from the corresponding block as a difference block; the merging process unit generates difference rectangles of rectangles including one or a plurality of difference blocks, and when generating the difference rectangles determines the method of forming the difference rectangles based on the number of difference rectangles and the total area of the difference rectangles; and the output unit sends the generated difference rectangles to the printing device.

This configuration can reduce the amount of data sent from the image processing device to the printing device, and can suppress the increase in the processing load of the printing device.

When generating the difference rectangles in an image processing device according to another aspect of the invention, the merging process determines the method of generating the difference rectangles based on the number of difference rectangles, the total area of the difference rectangles, and the processing characteristics of the printing device.

This configuration can more effectively suppress the increase in the processing load of the printing device.

To achieve the foregoing object, another aspect of the invention is a printing system including an image processing device and a receiver device that receives image data. The image processing device has a storage unit that stores information related to image data stored by the receiver device, and an output unit that generates and sends to the receiver device image difference data identifying differences between the transmitted image data and one of the image data stored by the receiver device based on information the storage unit stores. The receiver device has a device storage unit that stores image data, and a device control unit that receives data sent by the image data and generates image data based on the image difference data and image data stored in the device storage unit.

This aspect of the invention can efficiently reduce the amount of data that is transmitted by generating and communicating image difference data using image data stored by the receiver device. The process that generates image difference data can also effectively reduce the amount of data, and enable faster processing.

In a printing system according to another aspect of the invention, the receiver device has a print unit that prints on a print medium; and the device control unit receives data sent by the image processing device, generates image data based on the image difference data and image data stored in the device storage unit, and prints the generated image data by the print unit.

This aspect of the invention can quickly and efficiently reduce the amount of data in the image data that is transmitted in a system that transmits and prints image data.

In a printing system according to another aspect of the invention, the storage unit of the image processing device stores a calculated value computed using a specific equation for a block of comparison image data, which is image data used for comparison; the comparison unit computes a calculated value using the specific equation for each block in the print image data, which is the image data of the image to be printed by the receiver device, and compares the calculated values of corresponding blocks in the comparison image data and the print image data; and the output unit sends control data including the image data of a block in the print image data that has a different calculated value than the corresponding block to the receiver device. The receiver device has a print unit that prints; the device storage unit stores the comparison image data; and when the control data is received, the device control unit prints an image by the print unit based on the comparison image data stored by the device storage unit and the image data of blocks contained in the control data.

To print an image with the printing device in this configuration of the invention, the control device can simply send the image data of the blocks in the print image data of the image to be printed that have a calculated value different from the calculated value of the corresponding block in the stored comparison image data to the receiver device, and the amount of data the control device sends to the receiver device can be reduced.

In a printing system according to another aspect of the invention, the output unit of the image processing device sends control data including image data of blocks with different calculated values than the corresponding blocks in the comparison image data together with location information indicating the position of the blocks in the comparison image data to the receiver device; and the device control unit of the receiver device superimposes the image data of a corresponding block contained in the control data to the position indicated by the location information contained in the control data on the comparison image data stored by the device storage unit when the control data is received, and prints an image by the print unit based on the comparison image data after superimposing the image data.

The receiver device in this aspect of the invention can print a desired image based on the stored comparison image data and the image data of the blocks received from the image processing device.

In a printing system according to another aspect of the invention, for one or a plurality of comparison image data, the storage unit of the image processing device relationally stores the calculated value of a block of the comparison image data and identification information identifying the comparison image data.

The device storage unit of the receiver device stores one or a plurality of comparison image data relationally to identification information for the comparison image data.

The control unit of the image processing device compares the calculated values of corresponding blocks in the print image data and one or a plurality of the comparison image data stored by the storage unit, selects the comparison image data having the fewest blocks with different calculated values, and sends to the receiver device control data including image data of the blocks in the print image data that have a different calculated value than the corresponding block in the selected comparison image data, and identification information for the selected comparison image data.

The device control unit of the receiver device prints an image by the print unit based on the comparison image data stored by the device storage unit relationally to the identification information contained in the control data, and the image data of the blocks contained in the control data.

In this configuration of the invention, the image processing device compares calculated values for corresponding blocks in the print image data and one or a plurality of comparison image data, and determines the comparison image data with the fewest blocks having a different calculated value. Because the comparison image data is selected by this method, the image processing device can determine the comparison image data closest to the print image data by the simple means of comparing the calculated values of the blocks.

Furthermore, because the comparison image data is selected by this method, the processing load is lighter and the time required to make a decision is shorter than when the closest comparison image data is determined by comparing individual dots in the print image data with individual dots in the comparison image data. This configuration of the invention also enables the image processing device to report the selected image data to the receiver device by means of the identification information.

The printing device can also retrieve the comparison image data selected by the control device from the stored comparison image data based on the identification information, and can print an image based on the identified comparison image data and the image data of the received blocks.

In a printing system according to another aspect of the invention, the comparison unit of the image processing device compares the calculated values of corresponding blocks in the comparison image data and the print image data, compares the image data of a block in the print image data having the same calculated value as the corresponding block in the comparison image data with the image data of the corresponding block in the comparison image data, and if the image data of the corresponding blocks differs, includes the image data of the block with the same calculated value in the control data.

The calculated value is a value computed from the block using a specific equation, and there are situations in which the content of the image data in each block can differ even though the calculated value of the block in the comparison image data and the calculated value of the block in the print image data are the same.

In this configuration of the invention, the image processing device can include the image data of blocks in the print image data in the control data when the content of the image data in the blocks is different even if the calculated value of a block in the comparison image data and the calculated value of the corresponding block in the print image data are the same.

In a printing system according to another aspect of the invention, the comparison unit of the image processing device compares a block formed by segmenting process target image data, which is image data to be processed, with a block formed by segmenting comparison image data, which is image data for comparison; the merging process unit identifies a block of the process target image data with different data content as a difference block, and generates a rectangular difference rectangle including one or a plurality of difference blocks; the output unit sends the generated difference rectangles, and when generating the difference rectangles determines the method of generating the difference rectangles based on the number of difference rectangles and the total area of the difference rectangles; the receiver device has a print unit that prints; and the device control unit of the receiver device controls the print unit to print based on the comparison image data stored by the device storage unit and the difference rectangles received from the image processing device.

This configuration of the invention reduces the amount of data sent from the image processing device to the receiver device, and can suppress the increase in the processing load of the receiver device.

In a printing system according to another aspect of the invention, the merging process unit of the image processing device determines the method of generating the difference rectangles based on the number of difference rectangles, the total area of the difference rectangles, and a processing characteristic of the receiver device.

This configuration can more effectively suppress the increase in the processing load of the receiver device.

Another aspect of the invention is a control method of an image processing device, including: segmenting a first image and a second image into rectangular cells each containing a plurality of pixels; comparing the first image and the second image, and identifying corresponding cells that are different; extracting the identified cells, combining plural cells, and generating rectangular units; and outputting image difference data for the first and second images based on the generated units.

This configuration runs a process that removes pixels that are the same in the first image and second image from the units of differences between the first image and second image. As a result, even if the number of pixels in the cells that are extracted as differences between the first image and second image, the number of pixels that are not different in the image difference data that is finally output can be reduced. Image difference data with little waste can therefore be output even if the number of pixels in the cells is increased in order to accelerate processing. Both reducing the amount of data and accelerating processing can therefore be achieved in a process that uses image data for differences between images to reduce the amount of data.

A control method of an image processing device according to another aspect of the invention preferably also includes: storing a calculated value computed using a specific equation for a block of comparison image data, which is image data used for comparison; computing a calculated value using the specific equation for each block in the print image data, which is the image data of the image to be printed by a printing device; comparing the calculated values of corresponding blocks in the comparison image data and the print image data; and sending the image data of a block in the print image data having a calculated value different from the calculated value of the corresponding block in the comparison image data to the printing device.

In this aspect of the invention, the image processing device sends the image data of blocks in the print image data of the image to print that have a different calculated value than the corresponding block in the stored comparison image data to the printing device. As a result, by previously storing the comparison image data in the printing device, the printing device can print an image based on the stored comparison image data and the image data from the received blocks. To print an image, the control device can therefore simply send the image data of the blocks in the print image data of the image to be printed that have a calculated value different from the calculated value of the corresponding block in the stored comparison image data to the printing device, and the amount of data the image processing device sends to the printing device can be reduced.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 2(A) and 2(B) are flow charts illustrating the operation of a printing system.

FIGS. 9(A) and 9(B) are flow charts showing the operation of the host computer and inkjet printer.

FIGS. 16(A), 16(B) and 16(C) describe the block compression process.

FIGS. 17(A), 17(B) and 17(C) describe the block compression process.

FIG. 18 is used to describe merging process candidates.

FIGS. 19(A) and 19(B) describe merging process candidates.

DESCRIPTION OF EMBODIMENTS

Some embodiments of the present invention is described below with reference to the accompanying figures.

Figure 1:
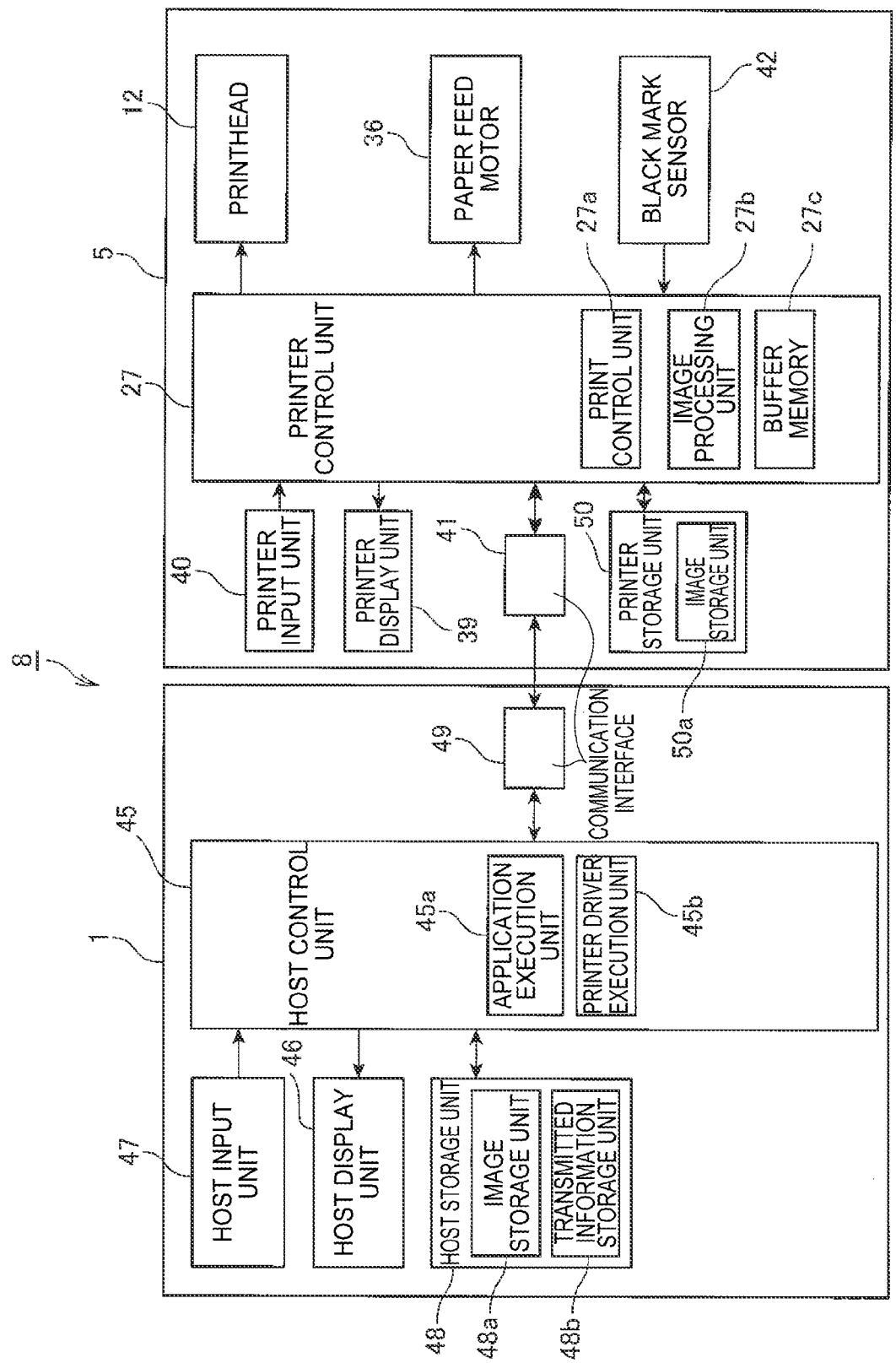
FIG. 1 is a function block of a printing system according to some embodiments of the invention.

FIG. 1 is a function block of a printing system 8 (image transmission system) according to this embodiment of the invention.

The printing system 8 comprises a printer 5 (receiver device, printing device) and a host computer 1 (image processing device, control device) that controls the printer 5 connected so they can communicate with each other.

The printing system 8 is a system in which the host computer 1 outputs print commands and print data to the printer 5 in response to user operations, and the printer 5 then prints on a print medium based on the print commands and print data.

The host computer 1 has a host control unit 45 (control unit) that controls other parts of the host computer 1. The host control unit 45 has an application execution unit 45a and a printer driver execution unit 45b (comparison unit, merging process unit, unit processor, output unit).

The application execution unit 45a executes application programs such as a text editing program, image editing program, or POS application. When printing is commanded by a user operation, the application execution unit 45a generates and outputs print data for printing the created document or image.

The printer driver execution unit 45b executes a device driver program for controlling the printer 5. The printer driver execution unit 45b generates commands to control the printer 5 and data related to those commands, outputs to the printer 5, and controls printer 5 operation. For example, the printer driver execution unit 45b generates and outputs print data and print commands instructing the printer 5 to print based on the print data output by the application execution unit 45a. Note that the device driver program run by the printer driver execution unit 45b is not limited to a program optimized for the printer 5, and could be a generic device driver program.

The program could also be a device driver program for other printer models. In this event, the printer 5 may be configured to process commands and data output by the printer driver execution unit 45b for a different model of printer.

The host computer 1 also has a host display unit 46 for displaying information, a host input unit 47 for detecting operation of the connected input devices, a host storage unit 48 for storing data, and a communication interface 49 for communicating with the printer 5.

The host display unit 46 and host input unit 47 are provided for operation by the user.

The host storage unit 48 nonvolatilely stores programs such as the control program, application program, or device driver program run by the host control unit 45, and data related to these programs.

One example of the printer 5 according to this embodiment is an inkjet printer. In this embodiment the printer 5 has an inkjet printhead 12 (print unit) with nozzles that eject ink. The printhead 12 is a head with nozzles formed in rows in the direction perpendicular to the conveyance direction. This printhead 12 has a separate nozzle row for each of four colors, cyan (C), magenta (M), yellow (Y), and black (K), and is capable of full-color printing on the print medium. The number of nozzle rows and nozzles on the printhead 12 is not specifically limited. More particularly, the printhead 12 may obviously be configured to use more colors of ink, or be configured to print with two colors or one color for monochrome printing.

The print media used by the printer 5 could be cut-sheet media that is precut to a specific size, or continuous sheet media, and the sheet media could be paper or plastic media. The sheets may also be fine paper with a surface coating that is suitable for inkjet printing and improves ink absorbency and fixability. The continuous sheet media may be a rolled paper of media wound into a roll and stored in the print media storage compartment (not shown in the figure) of the printer 5, or fanfold paper that is supplied to the printer 5 from a folded stack of continuous paper stored outside the printer 5. In addition to paper rolls of plain paper or fine paper, another example of roll paper is label paper having labels of a fixed size with an adhesive coating on the back side affixed to a liner (backer) and wound into a roll.

The printer 5 has a printer control unit 27 (print control unit) that controls other parts of the printer 5. The printer control unit 27 includes a CPU as an operating unit, ROM and RAM. Firmware that can be executed by the CPU and data related to the firmware are stored nonvolatilely in the ROM of the printer control unit 27. Data related to the firmware run by the CPU is also temporarily stored in RAM. The printer control unit 27 may also have other peripheral circuits.

In addition to the printhead 12 described above, a paper feed motor 36, a printer display unit 39, a printer input unit 40, a communication interface 41, a black mark sensor 42, and a printer storage unit 50 (device storage unit) are also connected to the printer control unit 27.

The printer display unit 39 has multiple LEDs or an LCD panel, and displays the operating status of the printer 5 as controlled by the printer control unit 27. The printer input unit 40 includes various switches, and outputs signals corresponding to the operation of the switches to the printer control unit 27.

The communication interface 41 connects to the host computer 1.

A black mark sensor 42 is an optical sensor disposed to the conveyance path through which the print medium (label paper or roll paper) is conveyed inside the printer 5, and detects the black marks (not shown in the figure) formed on the print medium for positioning. The communication interface 41 (interface) communicates with the host computer 1 according to a specific protocol as controlled by the printer control unit 27.

The paper feed motor 36 turns the conveyance rollers (not shown in the figure) as controlled by the printer control unit 27 to convey the print medium. The paper feed motor 36 is a stepper motor in this embodiment, and the amount and direction of rotation of the paper feed motor 36 can be controlled by the printer control unit 27. The black mark sensor 42 detects the black marks while the print medium.

Function blocks of the printer control unit 27 include a print control unit 27a, an image processing unit 27b, and buffer memory 27c. The print control unit 27a and image processing unit 27b are functions achieved by the CPU running firmware. The buffer memory 27c is a storage area reserved in RAM (not shown in the figure) of the printer control unit 27. The buffer memory 27c could be reserved in the printer storage unit 50, or the buffer memory 27c could be reserved in RAM externally connected to the printer control unit 27.

The image processing unit 27b also functions as a comparator, merge processing unit, unit processor, and output unit.

The printer storage unit 50 includes a storage medium such as EEPROM, flash memory, or other type of semiconductor memory, or a hard disk drive, and nonvolatilely stores data rewritably. The printer storage unit 50 stores programs that are executed by the printer control unit 27, and data including font data that is processed by the printer control unit 27. An image storage unit 50a that stores image data received from the host computer 1 is also embodied in the printer storage unit 50.

The print control unit 27a prints based on the print data and print commands input from the host computer 1 through the interface 41. The print control unit 27a controls the paper feed motor 36 to convey the label paper 14 while driving the printhead 12 to eject ink onto the print medium.

The print control unit 27a calls the image processing unit 27b to process print data received from the host computer 1. The image processing unit 27b renders the image to be printed as raster data in the buffer memory 27c based on the received print data. The buffer memory 27c is a storage area created according to the print resolution of the printhead 12 and the size of the printable area of the printer 5.

When image data for printing a first image is contained in the print data received from the host computer 1, the image processing unit 27b renders an image based on the image data to the buffer memory 27c, and stores the image data in the image storage unit 50a.

When image difference data is contained in the print data received from the host computer 1, the image processing unit 27b renders an image in the buffer memory 27c based on the image difference data. This image difference data is image data representing the differences between image data for printing a second image and the image data for printing the first image that was already received. The host computer 1 generates the image difference data. The image processing unit 27b renders an image in the buffer memory 27c based on the image data stored in the image storage unit 50a, and renders an image based on the image difference data and then renders the new image in buffer memory 27c.

Based on a predefined lookup table (LUT), the print control unit 27a converts the color information for each pixel in the image data buffered to the buffer memory 27c to the amount of each color of ink to be ejected by the inkjet line head 12 for each pixel. The print control unit 27*a* then determines the position and size of each dot discharged by the printhead 12 for each color of ink based on the converted ink amounts, and prints.

Embodiment 1

FIG. 2 is a flow chart illustrating the operation of the printing system 8, (A) showing the operation of the host computer 1 and (B) showing the operation of the printer 5.

FIG. 2 describes an example in which the host computer 1 sends image data one page at a time to the printer 5 in order to drive the printer 5 to print plural pages (3 pages in this example) of image data generated by an operation of the application execution unit 45*a*. The printer 5 receives and prints the image data one page at a time.

As shown in FIG. 2(A), the printer driver execution unit 45*b* of the host computer 1 acquires the image data for the first page (page 1) to be printed by the printer 5 from the application execution unit 45*a* (step S11). The printer driver execution unit 45*b* then sends the acquired image data through the communication interface 49 to the printer 5 (step S12).

As shown in FIG. 2(B), the printer control unit 27 of the printer 5 receives print data (first print data) including the image data sent from the host computer 1, and prints an image based on the image data contained in the print data (step S21).

Next, the printer driver execution unit 45*b* of the host computer 1 gets the image data for the next page (page 2) (step S13). In this step, the printer driver execution unit 45*b* generates image difference data representing the difference between the image data previously sent to the printer 5 (page 1) and the image data acquired in step S13 (page 2).

The printer driver execution unit 45*b* then sends print data (second print data) including the generated image difference data with a print command to the printer 5 (step S14).

The printer driver execution unit 45*b* then acquires image data for the next page (page 3) (step S15). In order to generate image difference data representing the difference between the acquired image data (page 3) and the image data that was already sent to the printer 5, the printer driver execution unit 45*b* selects the image data to be used for difference comparison. More specifically, of the image data (for page 1) that was already sent and the image data for page 2, the printer driver execution unit 45*b* selects the image data with the least difference to the image data (for page 3) that is to be sent next. In this example the difference is smallest between the image data for page 1 and the current image data for page 3, and the printer driver execution unit 45*b* therefore selects the image data for page 1 (step S16).

The printer driver execution unit 45*b* then generates image difference data representing the difference between the selected image data (for page 1) and the image data for the current page (page 3), and sends print data (third print data) including this image difference data with a print command to the printer 5 (step S17). Information specifying the image data (page 1) used for difference comparison is included with the image difference data in the print data (third print data) generated by the printer driver execution unit 45*b*.

When the second print data is sent from the host computer 1, the printer control unit 27 receives the print data (step S22). Because image difference data is contained in the received print data, the image processing unit 27*b* generates the image data to print based on the image difference data, and renders an image based on this image data in the buffer memory 27*c* (step S23). By merging the image data (page 1) stored in the image storage unit 50*a* with the image difference data that was received, the image processing unit 27*b* recreates the image (of page 2) in the buffer memory 27*c*. In this event, the image processing unit 27*b* can recreate the image data by writing the received image difference data over the image data stored in the image storage unit 50*a*.

Alternatively, the image processing unit 27*b* may read the image data used for difference comparison from the image storage unit 50*a*, and execute a process that combines this image data with the image difference data to recreate the image data (for page 2). In this event, the image processing unit 27*b* renders an image based on the recreated image data (page 2) in the printer control unit 27. The print control unit 27*a* then prints the image rendered in buffer memory 27*c* (step S24).

When the third print data is sent from the host computer 1, the printer control unit 27 receives that print data (step S25). Because the image difference data is contained in the received print data, the image processing unit 27*b* in this event generates and renders image data to print based on the image difference data in the buffer memory 27*c* (step S26).

The image processing unit 27*b* recreates the image data (for page 3) in the buffer memory 27*c* by merging the image data (for page 1) stored in the image storage unit 50*a* with the received image difference data. The print control unit 27*a* then prints the image data rendered in the buffer memory 27*c* (step S27).

The host computer 1 stores the image data sent by the printer driver execution unit 45*b* to the printer 5 in an image storage unit 48*a* (storage unit) of the host storage unit 48. The host computer 1 also stores information related to the image difference data and the image data stored by the printer 5 in a transmitted information storage unit 48*b* of the host storage unit 48.

When the printer driver execution unit 45*b* sends print data including image data or image difference data to the printer 5, it also stores the image data or the image difference data in the image storage unit 48*a* and updates the information in the transmitted information storage unit 48*b*. As a result, the host computer 1 can control operation based on the image data or image difference data stored by the printer 5.

The printer 5 also stores the image data and image difference data received from the host computer 1 in the image storage unit 50*a*.

The printer driver execution unit 45*b* has information related to the storage capacity of the image storage unit 50*a* in the printer 5, and the ability to manage the data stored in the image storage unit 50*a*. More specifically, the printer driver execution unit 45*b* determines whether or not the transmitted data can be stored in the image storage unit 50*a* when sending image data or image difference data to the printer 5. This decision is based on the available capacity in the image storage unit 50*a* and the size of the image data or image difference data to be sent to the printer 5. If it is determined that the image data or the image difference data cannot be stored in the image storage unit 50*a*, the printer driver execution unit 45*b* sends a command to delete image data or image difference data already stored in the image storage unit 50*a* to the printer 5. When a response to this command is received from the printer 5, the printer driver execution unit 45*b* updates the information in the transmitted information storage unit 48*b*.

To generate the image difference data to be sent to the printer 5, the printer driver execution unit 45*b* selects the image data to be used for the difference comparison (the source image data from which the difference will be calculated) from among the image data stored in the image storage unit 50*a*. As described above, the printer driver execution unit 45*b* selects the image data with the smallest difference.

FIG. 3 illustrates an image transmission method that uses image difference data when sending image data from the host computer 1 to the printer 5.

FIG. 3 shows an example of an operation that repeatedly prints five different printouts. The five printouts that are printed in this example are labels having text printed over five different backgrounds. More specifically, the printing system 8 according to this embodiment uses first to fifth background images to print five different printouts three times (three iterations), producing a total of 15 printouts. The printouts more specifically include printouts A, A2, A3 using a first background image, printouts B, B2, B3 using a second background image, printouts C, C2, C3 using a third background image, printouts D, D2, D3 using a fourth background image, and printouts E, E2, E3 using a fifth background image. Printout A printed in the first iteration, printout A2 printed in the second iteration, and printout A3 printed in the third iteration have a common background image and content that differs in part. Printouts B, B2, and B3 likewise have the same background image and content that differs in part. Printouts C, C2, C3, printouts D, D2, D3, and printouts E, E2, E3 also have the same combinations. Printouts A, A2, A3 have the same background image and are therefore printouts with a high degree of similarity. This is also true for printouts B, B2, B3, printouts C, C2, C3, printouts D, D2, D3, and printouts E, E2, E3. Each printout in this example corresponds to a "page" referred to in the flow chart in FIG. 2, and printouts A to E3 correspond to pages 1 to 15.

Figure 3A:
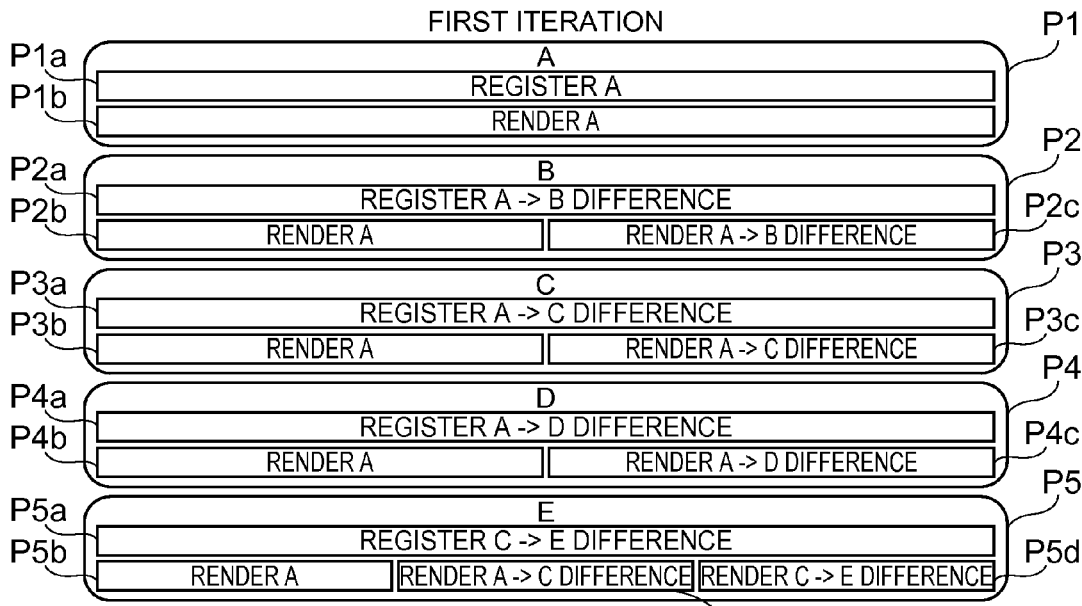
FIGS. 3(A), 3(B) and 3(C) illustrate an image transmission method using image difference data.
Figure 3B:
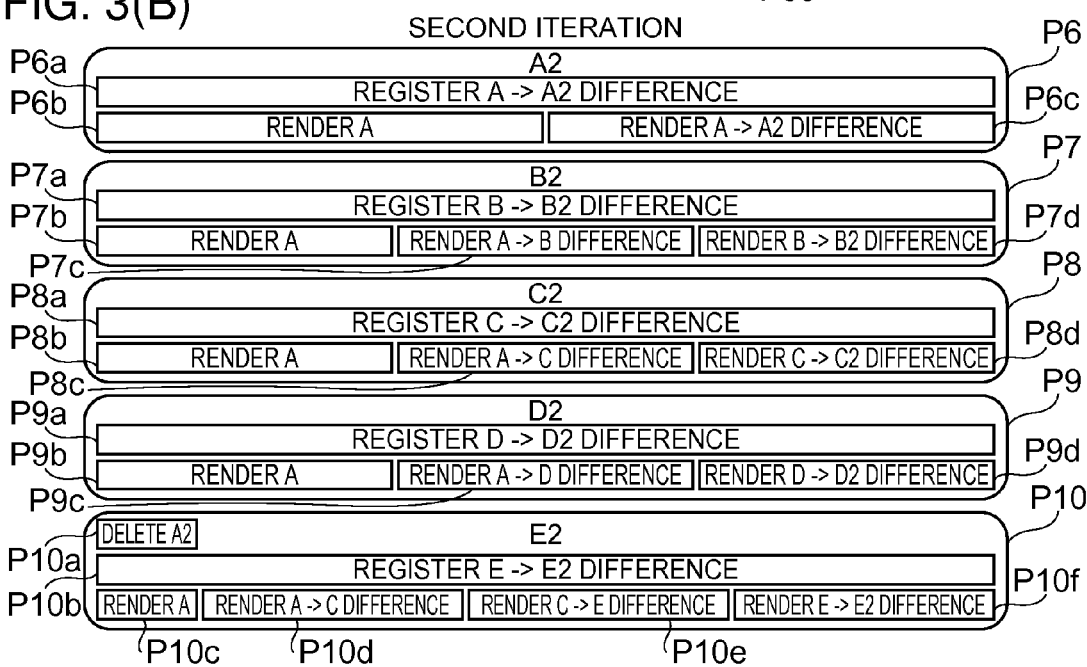
Figure 3C:
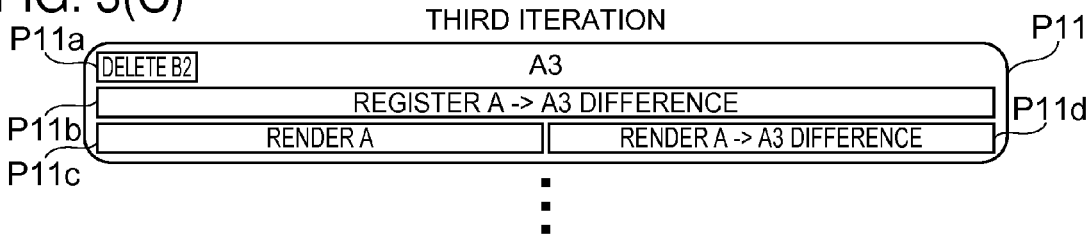

The host computer 1 controls the printer 5 to print the image data for printing these five different printouts as images A to E3 in the sequence printouts A to E, A2 to E2, and A3 to E3. The information printed to one printout is processed in this embodiment as one image. In other words, in the example described in this embodiment, one printout is one page, and the information for this one page consists of one image. The host computer 1 sends image data for the image of the printout as data for printing the printout to the printer 5, and the printer 5 produces the printout by rendering and printing the image on the print medium. In FIG. 3(A) illustrates the printing process during the first iteration (iteration), (B) illustrates the process during the second iteration, and (C) shows the third iteration. The boxes in FIG. 3(A) to (C) show the processes executed by the image processing unit 27*b*. Note further that images A to E3 are either the first image or the second image.

In the first iteration, the print control unit 27*a* executes the printing process for printouts A to E using images A to E. More specifically, the printer driver execution unit 45*b* and the image processing unit 27*b* execute the following process.

The printer driver execution unit 45*b* sends image data for image A, and the image processing unit 27*b* renders image A in the first process P1 of the first iteration shown in FIG. 3(A). Process P1 includes process P1a that registers the image data for image A received from the host computer 1, and process P1b that renders image A in the buffer memory 27*c*.

Next, the printer driver execution unit 45*b* sends the image difference data for image A and image B. The image processing unit 27*b* then renders image B in process P2. Process P2 includes process P2a that registers the image difference data between image A and image B received from the host computer 1, process P2b that renders image A in the buffer memory 27*c*, and process 2c that renders image B by overwriting the image difference data in the buffer memory 27*c*.

The printer driver execution unit 45*b* next sends image difference data for image A and image C to the printer 5. By selecting image A as the source image for generating the image difference data of image C, there is no need to store image B in the image storage unit 50*a*, and image B can be deleted at any time to open storage capacity in the image storage unit 50*a*. If there is sufficient capacity available in the image storage unit 50*a*, the printer driver execution unit 45*b* may generate image difference data representing the difference between image B and image C.

The image processing unit 27*b* receives the image difference data between image A and image C, and renders image C in process P3. Process P3 includes process P3a for registering the image difference data, process P3b for rendering image A in the buffer memory 27*c*, and process P3c for overwriting the image difference data to the buffer memory 27*c* and rendering image C.

The printer driver execution unit 45*b* then generates and sends image difference data for image A and image D to the printer 5. The image processing unit 27*b* receives the image difference data for image A and image D, and renders image D in process P4. Process P4 includes process P4a for registering the image difference data received from the host computer 1, process P4b for rendering image A in the buffer memory 27*c*, and process P4c for rendering image D by overwriting the image difference data to the buffer memory 27*c*.

The printer driver execution unit 45*b* then generates and sends image difference data for image A and image E to the printer 5. The image processing unit 27*b* receives the image difference data for image A and image E, and renders image E in process P5. Process P5 includes process P5a for registering the image difference data, process P5b for rendering image A in the buffer memory 27*c*, and process P5c for rendering image E by overwriting the image difference data to the buffer memory 27*c*.

Next, the printing system 8 executes the second iteration of the process as shown in FIG. 3(B). More specifically, the printer driver execution unit 45*b* and image processing unit 27*b* operate as follows to execute the printing process for printouts A2 to E2.

The printer driver execution unit 45*b* sends image difference data for image A and image A2 to the printer 5. The image processing unit 27*b* receives the image difference data for image A and image A2, and renders image A2 in process P6. Process P6 includes process P6a for registering the image difference data received from the host computer 1, process P6b for rendering image A in the buffer memory 27*c*, and process P6c for rendering image A2 by overwriting the image difference data in the buffer memory 27*c*.

Next, the printer driver execution unit 45*b* sends the image difference data for image B and image B2 to the printer 5. Because image B and image B2 use the same background image, the resemblance (similarity) therebetween is great and the image difference data is small. The amount of image data that is sent and received can therefore be efficiently reduced by using image difference data representing the difference between image B and image B2. The image processing unit 27*b* therefore receives the image difference data for image B and image B2, and renders image B2 in process P7.

Process P7 includes process P7a for registering the image difference data between image B and image B2 received from the host computer 1, and process P7b for rendering image A in the buffer memory 27*c*. The image processing unit 27*b* also executes process P1c that overwrites the image difference data between image A and image B stored in the image storage unit 50*a*, and renders image B. The image processing unit 27*b* then executes process P7d that renders image B2 by overwriting the image difference data between image B and image B2 received from the host computer 1 to memory. Process P7 thus renders image B2 without using the image data for image B. Because the size of the image difference data between image A and image B is smaller than the size of the image data for image B, less storage capacity is used in the image storage unit 50*a*.

If only the data the printer 5 receives from the host computer 1 is used as in process P7, the image data rendered in the image processing unit 27*b* using the image difference data may be stored in the image storage unit 50*a*. This improves processing efficiency and enables high speed processing. This embodiment describes an example in which the image data rendered based on the image difference data by the image processing unit 27*b* is also stored in the image storage unit 50*a*.

The printer driver execution unit 45*b* then sends the image difference data between image C and image C2 to the printer 5. The image processing unit 27*b* receives the image difference data between image C and image C2, and renders image C2 in process P8.

Process P8 includes process P8a for registering the image difference data received from the host computer 1, and process P8b for rendering image A in the buffer memory 27*c*. The image processing unit 27*b* also executes a process P8c that overwrites the image difference data between image A and image C stored in the image storage unit 50*a* to the buffer memory 27*c*, and renders image C. Next, the image processing unit 27*b* executes process P8d that renders image C2 by writing the image difference data received received from the host computer 1.

The printer driver execution unit 45*b* then sends image difference data for image D and image D2 to the printer 5. The image processing unit 27*b* receives the image difference data between image D and image D2, and renders image D2 in process P9.

Process P9 includes process P9a for registering the image difference data received from the host computer 1, and process P9b for rendering image A in the buffer memory 27*c*. The image processing unit 27*b* also executes a process P9c that overwrites the image difference data between image A and image D stored in the image storage unit 50*a* to the buffer memory 27*c*, and renders image D. Next, the image processing unit 27*b* executes process P9d that renders image D2 by writing the image difference data received from the host computer 1.

Yet different image difference data is used to print printout E2. The printer driver execution unit 45*b* sends image difference data for image E and image E2 to the printer 5. The image processing unit 27*b* receives the image difference data between image E and image E2, and renders image E2 in process P10.

To ensure sufficient storage capacity in the image storage unit 50*a* before sending the image difference data, the printer driver execution unit 45*b* instructs deleting the image data for image A2 from the image storage unit 50*a*. As a result, process P10 executed by the image processing unit 27*b* first deletes the image data for image A2 from the image storage unit 50*a* in process P10a.

In process P5 in (A) of FIG. 3, the printer driver execution unit 45*b* had already sent image difference data for image C and image E to the printer 5. As a result, image difference data for image C and image E is already stored in the image storage unit 50*a*. The image processing unit 27*b* therefore uses this image difference data to render image E. More specifically, the image processing unit 27*b* executes process P10b to register the image difference data between image E and image E2 received from the host computer 1, and executes process 10*c* to render image A in the buffer memory 27*c* based on the image data for image A stored in the image storage unit 50*a*. The image processing unit 27*b* also executes process 10*d* that overwrites the image difference data for image C and image A stored in the image storage unit 50*a*, and renders image C in buffer memory 27*c*. Next, the image processing unit 27*b* executes process 10*e* that overwrites the image difference data for image C and image E stored in the image storage unit 50*a*, and renders image E. The image processing unit 27*b* then executes process 10*f* that overwrites the image difference data for image E and image E2 received from the host computer 1 and renders image E2. The image processing unit 27*b* can thus render image data for the target printout in the buffer memory 27*c* by combining image difference data for plural different images. The amount of image data stored in the image storage unit 50*a* can be efficiently reduced by this process of combining image difference data for plural different images. The image processing unit 27*b* also uses image difference data received from the host computer 1, and the printer control unit 27 does not execute a process that generates image difference data. The processing load on the printer control unit 27 is therefore light.

Operation following the third iteration shown in FIG. 3(C) is the same as in the second iteration described above. More specifically, the printer driver execution unit 45*b* sends image difference data to the printer 5. The image processing unit 27*b* receives the image difference data, and renders image data for the target printout using the image data for image A stored in the image storage unit 50*a*, and the image difference data. As a result, the amount of data sent from the host computer 1 to the printer 5, and the amount of data stored in the image storage unit 50*a*, can be suppressed, and plural different printouts can be efficiently printed while changing the content of the individual printouts.

Operation when the printer driver execution unit 45*b* generates image difference data is described next.

Figure 4:
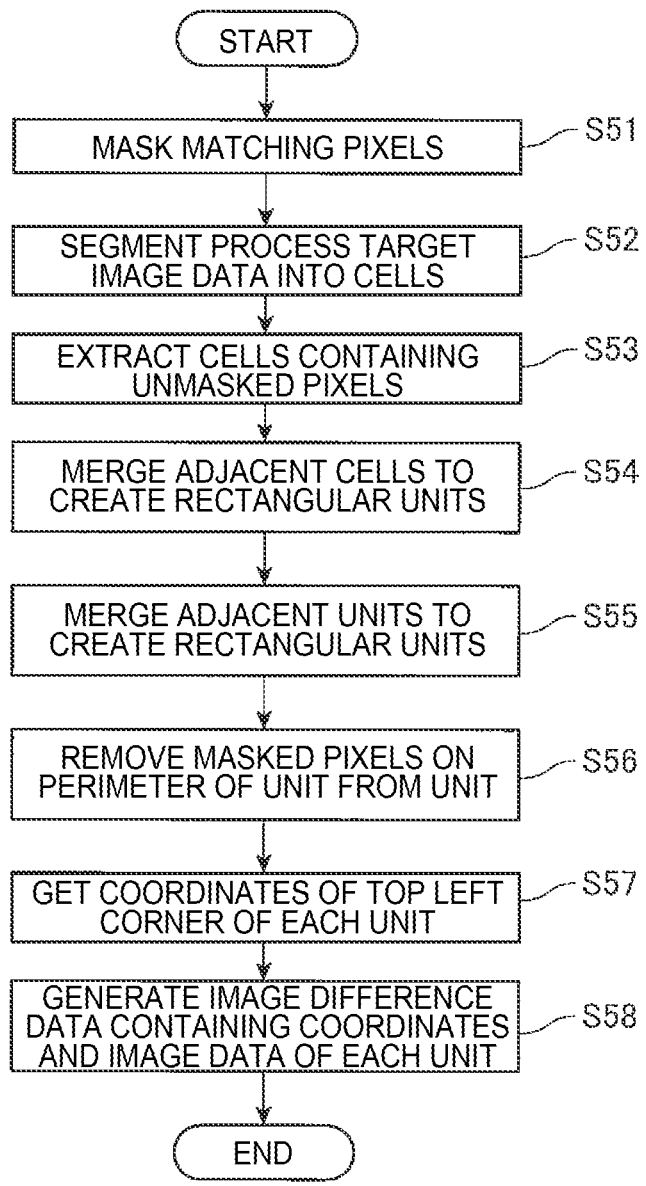
FIG. 4 is a flow chart illustrating an operation that generates image difference data.
Figure 5:
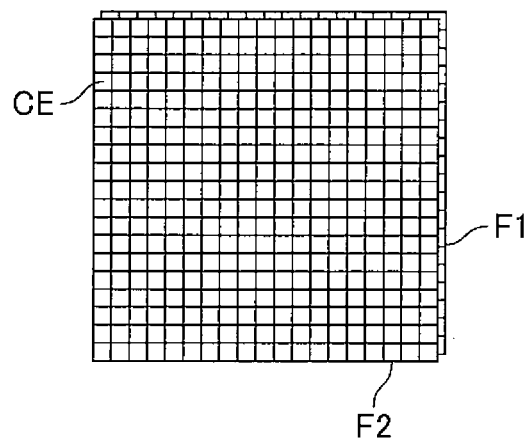
FIGS. 5(A), 5(B) and 5(C) illustrate the operation of generating image difference data.
Figure 5:
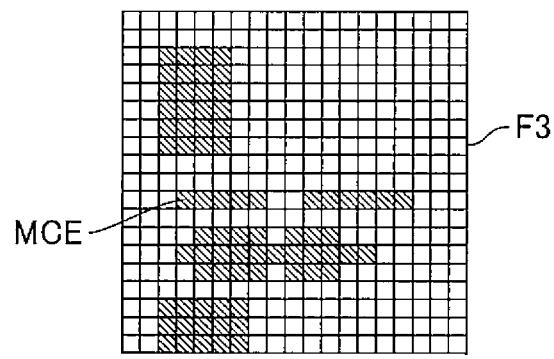
Figure 5:
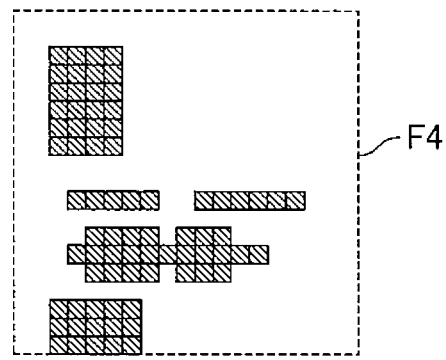

FIG. 4 is a flow chart illustrating the operation whereby the printer driver execution unit 45*b* generates image difference data. FIG. 5 and FIG. 6 illustrate generating the image difference data by the printer driver execution unit 45*b*. Of the operations of the printer driver execution unit 45*b* shown in FIG. 4, the operation of step S51 is a comparison process, the operation of steps S52 to S55 is a merging process, and the operation of step S56 is a unit processing step. The host control unit 45 also functions as an output unit that outputs the resulting image difference data.

The printer driver execution unit 45*b* generates image difference data for two images (first image, second image). Before the operation shown in FIG. 4, the printer driver execution unit 45*b* reads the image data for the two images to be processed from the image storage unit 48*a*. In this example, the two images F1 and F2 that are read are rectangles as shown in FIG. 5(A), and the vertical pixel counts and horizontal pixel counts of the two images are the same. The printer driver execution unit 45*b* generates image data for the parts in image F2 that are different from image F1 as the image difference data.

Note that the printer driver execution unit 45*b* can obviously also generate image difference data for two images that do not have the same pixel counts. In this event, information indicating the locations of pixels that do not overlap may be added to the image difference data that is generated.

The printer driver execution unit 45*b* first superimposes the two images for which image difference data is to be generated, compares the images pixel by pixel, and masks the pixels for which the pixel information is the same (step S51). The pixel information in this example is the gray level of each color (R, G, B) in one pixel, for example.

Next, the printer driver execution unit 45*b* segments the superimposed image data into cells of a predetermined number of pixels (step S52).

Image data F1 and image data F2 corresponding to the first image and the second image to be processed are shown respectively divided into cells in FIG. 5(A). Each mask in the figure denotes one cell CE. The size of each cell CE is the same, and in this example is 64 pixels by 64 pixels.

The printer driver execution unit 45*b* next extracts the cells containing pixels that are not masked (step S53). A pixel that is not masked is a pixel with pixel information that is not the same in image data F1 and image data F2. The printer driver execution unit 45*b* does not extract only the pixels that are not masked, and instead extracts all of any cell containing a pixel that is not masked. The extracted cells MCE are shaded in FIG. 5(B). The shaded cells MCE in image data F3 shown in FIG. 5(B) include the pixels in image data F2 that are not masked. The cells that are not shaded are cells that are not masked. The printer driver execution unit 45*b* extracts only the shaded cells MCE from image data F3, and generates the extracted image data F4 shown in FIG. 5(C). The extracted image data F4 contains only the extracted cells, and the other parts are filled with null data.

Figure 6A:
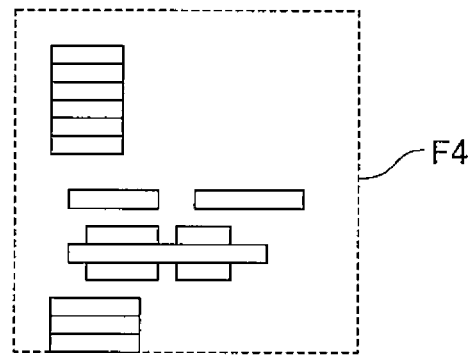
FIGS. 6(A), 6(B), 6(C) and 6(D) illustrate the operation of generating image difference data.

The printer driver execution unit 45*b* then executes a process of joining adjacent cells MCE in the extracted cells MCE and creating data units (step S54). Cells are grouped into units in step S54 by selecting either the x-axis (the image width) or the y-axis (the image height). As a result, the units that the printer driver execution unit 45*b* generates are also rectangles as shown in FIG. 6(A). In the example in FIG. 6(A), the cells are joined on the x-axis, and 16 rectangular units extending on the x-axis are created.

Figure 6B:
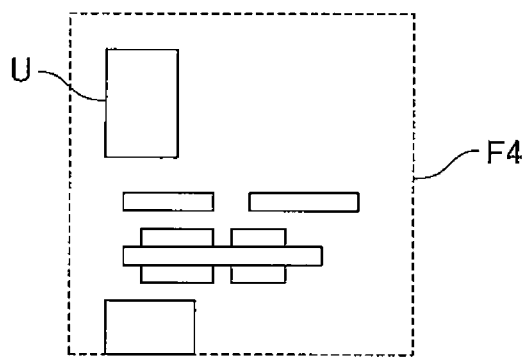

The printer driver execution unit 45*b* then joins the generated units that are mutually adjacent to create larger units (step S55). In step S55, the units are created along whichever of the x-axis or y-axis that was not selected in step S54. The printer driver execution unit 45*b* also creates rectangular units in this step. Of the units extending on the x-axis in the extracted image data F4 shown in FIG. 6(A), the printer driver execution unit 45*b* combines units that are mutually adjacent on the y-axis. Because the combined units are grouped into rectangular objects, each of the combined units must have the same size on the x-axis. As a result, the printer driver execution unit 45*b* combines units that have the same size on the x-axis and are mutually adjacent on the y-axis. As a result of this process, the units in the extracted image data F4 are combined into nine larger units as shown in FIG. 6(B). Each unit that is generated contains an integer multiple of the number of pixels in each cell (64 pixels by 64 pixels in this example). One unit shown in FIG. 6(B) is referred to below as a unit U.

The printer driver execution unit 45*b* may execute steps S54 and S55 in a single operation. More specifically, cells that are adjacent on both the x-axis and the y-axis may be joined to create rectangular units.

Figure 6C:
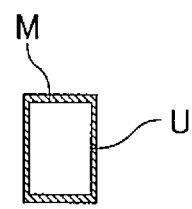
Figure 6D:
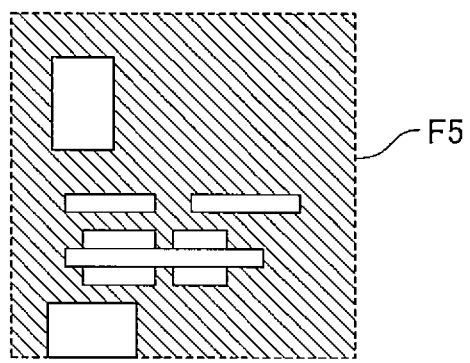

The printer driver execution unit 45*b* then executes a process of removing the masked pixels located on the perimeter of each generated unit from the unit (step S56). In step S53, the printer driver execution unit 45*b* extracts cells of a specific size (64 pixels by 64 pixels in this embodiment of the invention) including the pixels that are not masked. As a result, individual cells may contain a masked pixel. The units can therefore be further reduced in size if the masked pixels are excluded when there is a masked pixel in the edge of a unit and the rectangular shape of the unit can be maintained even if masked pixels are removed. When there is a band M of masked pixels around a unit U as shown in FIG. 6(C), this band M of pixels can be removed from the unit. One condition for being able to remove masked pixels is that the masked pixels extend without interruption on the y-axis or the x-axis of the unit, and are located at the outside edge of the unit. In other words, any one side at the top, bottom, left, or right edge of the unit must consist of only masked pixels. In this event, the side composed of masked pixels can be removed from the unit.

The printer driver execution unit 45*b* then generates information indicating the position of each unit (step S57). For example, the printer driver execution unit 45*b* acquires the coordinates of the top left corner of each unit. These coordinates are the X coordinate and Y coordinate of an imaginary X-Y coordinate system of which one vertex of the extracted image data is the origin. The printer driver execution unit 45*b* generates the coordinates of the top left corner of each unit, and image difference data including the image data of all units (step S58).

The image difference data generated in step S58 may be, for example, image data that is the same size as the original image data F2 and has the gray level of parts other than the extracted units set to transparent. In this event, the size of the image difference data can be reduced if the image difference data is output in an image format such as PNG that enables setting transparent pixels (or translucent pixels).

Alternatively, the image difference data generated in step S58 may be image data that is the same size as the original image data F2 and masks the parts other than the extracted units with a specific color. The image difference data F5 shown in FIG. 6(D) has the pixels in the shaded area masked with a specific color such as white, black, or gray. The total number of pixels in this image difference data F5 is the same as in the image data F2, but because the masked pixels are all the same color, the image difference data can be compressed with a high compression ratio if it is in a format such as JPEG, GIF, or PNG, and compressed image data that is small in size can be obtained.

The image difference data generated in step S58 may also be sets of image data in different units. In this event, one unit constitutes one set of image data. Information identifying the location of each unit may be contained in a separate file, or added to the image data of the respective unit.

The image difference data generated by the printer driver execution unit 45*b* is thus sent through the communication interface 49 (FIG. 1) to the printer 5. The printer driver execution unit 45*b* may compress the image difference data before transmission. In this event, the amount of data that is sent and received can be effectively reduced by the effect of compressing the image difference data. The printer driver execution unit 45*b* joins cells and creates larger units in steps S54 and S55. By compressing the image difference data, units with more pixels than individual cells are compressed, and the effect of compression can be easily achieved. The size of the image data to be communicated can therefore be reduced more effectively.

As described above, in the printing system 8 according to this embodiment of the invention, the host computer 1 uses image difference data to transmit image data for the printout to be printed by the printer 5. The host computer 1 segments a first image and a second image into rectangular cells containing a specific number of pixels, compares the first image and the second image to identify cells that are different in each image, extracts the identified cells, joins plural extracted cells to create rectangular units, and outputs the image difference data based on the generated units.

As a result, processing can be accelerated by increasing the number of pixels in each cell, for example, and the amount of data sent from the host computer 1 to the printer 5 can be decreased and faster processing can be achieved by using the image data of the differences.

The host computer 1 also executes a process that removes pixels that are located along the perimeter of the generated units and are the same in the first image and the second image as the sides of the units, and outputs image difference data based on the processed units. As a result, a process that removes pixels that are the same in the first and second images from the units obtained by joining cells containing pixels that are different in the two images, and image difference data from which matching pixels were removed is output. Therefore, image difference data with less waste can be output, processing can be accelerated, and the amount of data can be effectively reduced.

When plural adjacent units collectively form a rectangle, the host computer 1 joins these plural units into a larger unit. Because the number of pixels in the unit therefore increases, the effect of compression can be improved in the process that compresses the image difference data. Furthermore, because the number of units in the image difference data can be reduced, the amount of data needed to specify the location of units can be reduced, and the amount of data can be reduced more effectively.

Furthermore, the image difference data output by the host computer 1 may contain the image data in the unit and data identifying the position of the unit. In this event, the amount of data in the image difference data can be effectively reduced. The host computer 1 may also compress the image difference data for output. In this event, the amount of data in the image difference data can be further reduced.

The printer control unit 27 of the printer 5 receives data sent by the host computer 1, generates image data based on the image difference data and image data stored in the image storage unit 50a, and prints the generated image data. The amount of data in transmitted image data can therefore be quickly and efficiently reduced in a system that transmits and prints image data.

Some embodiments of the invention is described above with reference to a preferred embodiment thereof, but the invention is not limited thereto and can be modified and adapted in many ways without departing from the scope of the accompanying claims.

For example, the foregoing embodiment describes a configuration that sends image data for printing a printout from the host computer 1 to the printer 5 using an example in which image data for plural different images is transmitted. The invention is not so limited, and the invention can also be applied to randomly transmit image data for plural images that do not have a common background image.

The invention is also not limited to applications that use image difference data representing the differences between image data for a first image the host computer 1 sends to the printer 5 and the image data for the image to be printed next. For example, image data may be previously stored in the image storage unit 50a of the printer 5, and the host computer 1 may transmit image difference data for the image data stored in the image storage unit 50a and the image data to be printed. Because a method in which the host computer 1 sends only the image difference data to the printer 5 can be used in this case, the amount of data transmitted can be reduced more efficiently.

Embodiment 2

The printer 5 in this embodiment of the invention is an inkjet line printer. The printer 5 conveys the print medium in a forward conveyance direction, and prints images by ejecting ink from a printhead 12 onto a print medium to form dots.

Figure 7:
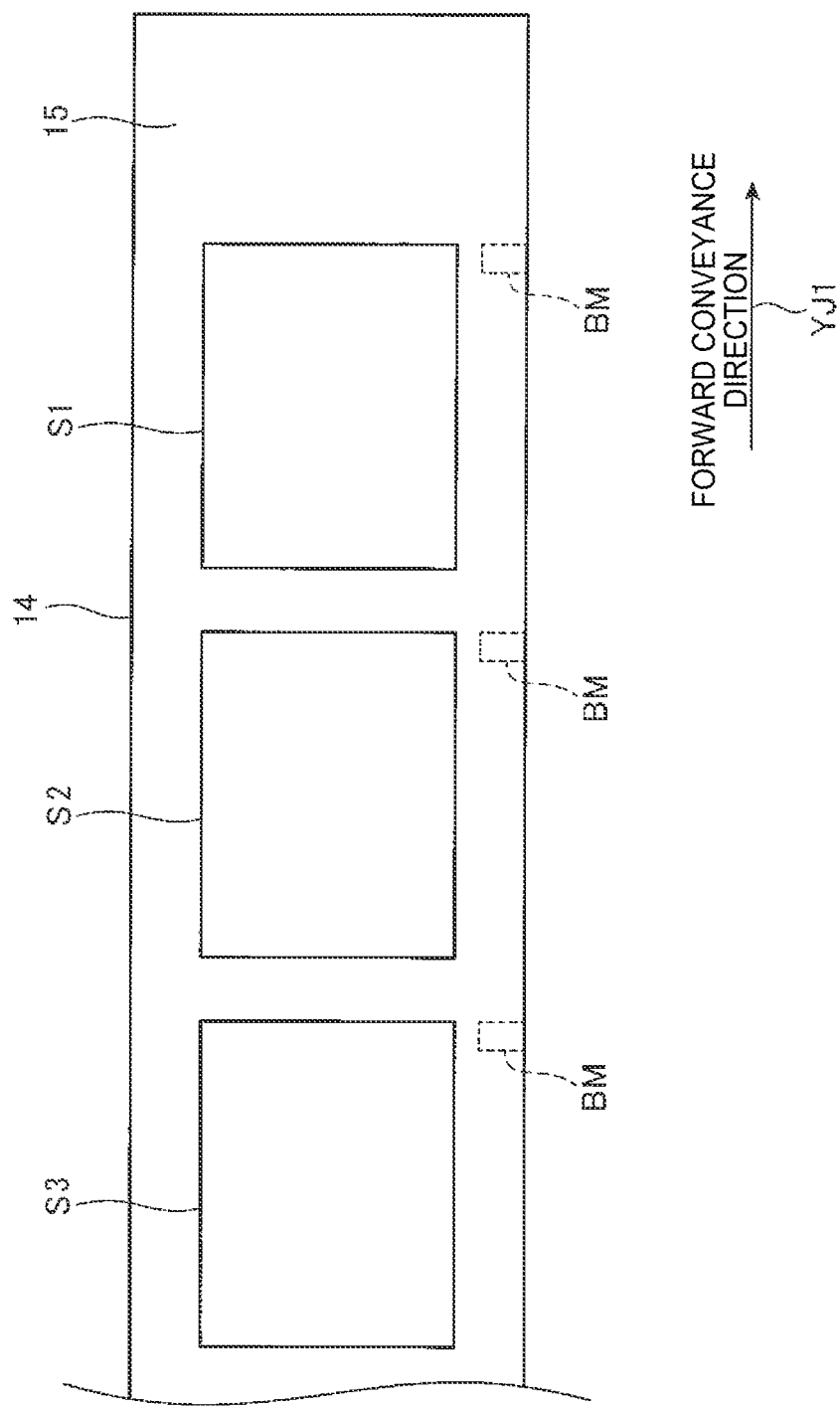
FIG. 7 shows an example of label paper that can be set in an inkjet printer.

FIG. 7 illustrates label paper 14 that can be loaded in the printer 5.

As shown in FIG. 7, the label paper 14 is a continuous sheet with multiple labels S affixed with a specific gap therebetween on the printing side 15 of the liner. The back side of each label S is coated with an adhesive, and the labels S can be peeled from the liner. The shape of each label S along the length is constant, and the gap between each label S is also constant. As described below, the printer 5 can print images continuously on the labels S affixed to the label paper 14. When the printer 5 prints on the label paper 14, the label paper 14 is set in the printer 5 so that the length of the label paper 14 is aligned with the forward conveyance direction YJ1.

The basic operation of the host computer 1 and printer 5 when continuously printing images to plural labels S on the label paper 14.

In the following example, the labels S on the label paper 14 include at least a first label S1, a second label S2, and a third label S3 from the downstream side to the upstream side of the conveyance direction. Device operation when printing images continuously is described below when the printer 5 prints images continuously and sequentially to the first label S1, second label S2, and third label S3. In the following description, the image printed to the first label S1 is referred to as the first image GQ1, the image printed to the second label S2 is referred to as the second image GQ2, and the image printed to the third label S3 is referred to as the third image GQ3.

The application execution unit 45a of the host control unit 45 of the host computer 1 executes the following process when printing images continuously to plural labels S.

The application execution unit 45a generates image data for the first image GQ1 (referred to below as first image data D1), image data for the second image GQ2 (referred to below as second image data D2), and image data for the third image GQ3 (referred to below as third image data D3).

In this embodiment, the image data is data that contains color-related information for each dot formed in a dot matrix pattern. The color-related information is information expressing red (R), blue (B), and green (G) color components with 256 gray scale values.

Next, the application execution unit 45a sequentially outputs the first image data D1, second image data D2, and third image data D3 to the printer driver execution unit 45b. The process related to outputting image data and the process related to generating other image data run in parallel.

Based on the input first image data D1, the printer driver execution unit 45b generates control data (referred to below as first control data C1) and controls the communication interface 49 to output to the printer 5. The printer driver execution unit 45b likewise sequentially sends control data (referred to below as second control data C2) based on the input second image data D2 and control data (referred to below as third control data C3) based on the third image data D3 to the printer 5. The content of this control data is described below.

The control data the printer 5 receives through the communication interface 41 is sequentially stored to a receive buffer not shown.

The printer control unit 27 of the inkjet printer 5 sequentially reads the control data stored in the receive buffer.

The printer control unit 27 starts conveying the label paper 14 in the forward conveyance direction YJ1 in response to reading the control data. While printing images continuously to plural labels S, the printer control unit 27 conveys the label paper 14 at a specific speed in the forward conveyance direction YJ1. As described above, the printer control unit 27 manages the position of the label paper 14 based on output from the black mark sensor 42 while conveying the label paper 14.

The printer control unit 27 renders image data for the first image GQ1 in an image buffer not shown based on the first control data C1. This process is described in further detail below. Based on the image data rendered in the image buffer, the printer control unit 27 controls the printhead 12 in an appropriate way at the appropriate timing to print the first image GQ1 on the first label S1. The printer control unit 27 likewise renders image data for the second image GQ2 in the image buffer not shown based on the second control data C2, and based on the rendered image data prints the second image GQ2 on the second label S2. The printer control unit 27 likewise renders image data for the third image GQ3 in the image buffer not shown based on the third control data C3, and based on the rendered image data prints the third image GQ3 on the third label S3.

Figure 8:
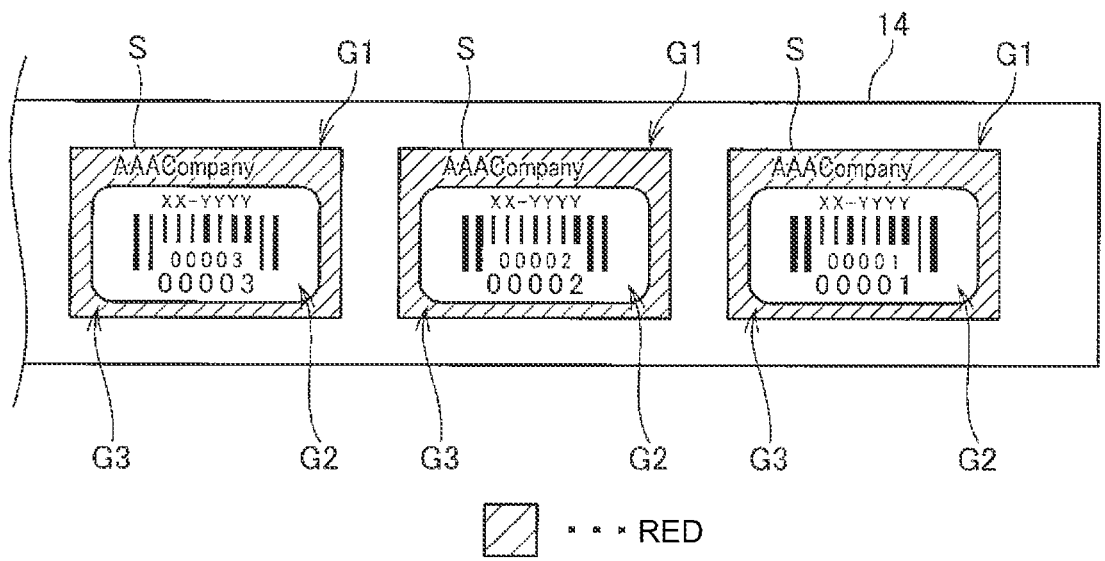
FIG. 8 shows an example of an image printed on a label.

FIG. 8 shows an example of images printed on the labels S of the label paper 14 in the printing system 8 according to this embodiment. In the example shown in FIG. 8, the labels S are peeled from the liner after the image is printed, and are affixed as labels to specific products or product packaging.

As shown in FIG. 8, a label image G1 is printed on each label S. Each label image G1 includes a variable image G2 that can be changed in each label image G1, and a static image G3 that is the same in every label image G1.

In the example in FIG. 8, the static image G3 is an image of a red border printed along the outside edge of the label S. The name of the product manufacturer, AAA Company in this example, is printed at a position along the top border of the label S in the static image G3. As shown in the example in FIG. 8, the same static image G3 is printed on each label S.

The variable image G2 is an image printed in the area surrounded by the border created by the static image G3. The variable image G2 includes a string (XX-YYYY in the example in FIG. 8) identifying the product model, a barcode representing a code assigned uniquely to each product, and a string representing a serial number uniquely assigned to each product.

Because the label image G1 includes a static image G3, one label image G1 and another label image G1 in any group of plural continuously printed label images G1 will include the same image in a specific area of the label.

Based on this characteristic, the host computer 1 according to this embodiment of the invention reduces the amount of data that is sent to the printer 5 when controlling the printer 5 to continuously print images to plural labels S. By reducing the amount of data that is transmitted, communication efficiency can be improved.

Operation of the host computer 1 and the printer 5 when continuously printing images to plural labels S on the label paper 14 is described below.

FIG. 9(A) is a flow chart showing the operation of the host computer 1, and (B) is a flow chart showing the operation of the printer 5.

While conveyance of the label paper 14 is not described in detail below, the printer control unit 27 controls conveying the label paper 14 appropriately to printing images on the labels S, managing the position of the label paper 14 during conveyance, and adjusting the conveyance distance and the position of the label paper 14.

The application execution unit 45a provides a user interface enabling the user to input the information required to print continuously (for example, information identifying the storage address of the image data for the images to print on the labels S), and an instruction to start printing the images. The user then inputs the required information and instructs starting image printing through the user interface (step SX1).

The application execution unit 45a executes the following process in response to the user instructing starting image printing.

First, the application execution unit 45a generates image data for the images to be continuously printed to the plural labels S (step SA1).

The image data generated by the application execution unit 45a in step SA1 is referred to below as print image data. In other words, the print image data is the image data for the image to print on a label S.

Next, the application execution unit 45a sequentially outputs the generated print image data to the printer driver execution unit 45b (step SA2).

Next, the printer driver execution unit 45b acquires the print image data for one image from the print image data input from the application execution unit 45a (step SA3). In step SA3, the printer driver execution unit 45b acquires the plural print image data input from the application execution unit 45a one print image data unit at a time in the order input (=the printing sequence). The print image data for one image acquired by the printer driver execution unit 45b in step SA2 is referred to below as the "process target image data GD1."

Next, the printer driver execution unit 45b determines if one or more comparison image data hashes J1 (described below) are stored in a specific storage area (storage unit) (step SA4). As will be understood below, the printer driver execution unit 45b stores a comparison image data hash J1 generated based on the process target image data GD1 to a specific storage address in response to execution of a process based on the process target image data GD1. Therefore, when the process target image data GD1 is the first print image data in the group of plural print image data sets input from the application execution unit 45a, a comparison image data hash J1 is not stored in the specific storage area. In this event in step SA4, the printer driver execution unit 45b determines that even one comparison image data hash J1 is not stored in the specific storage area (step SA4 returns NO).

However, when the process target image data GD1 is the second or later print image data in the group of plural print image data sets input from the application execution unit 45a, a comparison image data hash J1 is stored in the specific storage area. In this event in step SA4, the printer driver execution unit 45b determines that one or more comparison image data hashes J1 are stored in the specific storage area (step SA4 returns YES).

If in step SA4 it is determined that a comparison image data hash J1 is not stored in the specific storage area (step SA4 returns NO), the printer driver execution unit 45b executes the following process.

The printer driver execution unit 45b generates image data identification information DC, which is identification information uniquely identifying the process target image data GD1 (step SA5).

Next, the printer driver execution unit 45b compresses the process target image data GD1 using a specific compression method (step SA6).

Next, the printer driver execution unit 45b executes the following process (step SA7). The printer driver execution unit 45b generates control data including the image data identification information DC generated in step SA5 and the process target image data GD1 compressed in step SA6, and instructing printing based on the process target image data GD1.

Next, the printer driver execution unit 45b controls the communication interface 49 to send the generated control data to the printer 5 (step SA8).

The image data identification information DC included in the control data sent in step SA8 is referred to below as print image data identification information DC1, and is different from the selected image data identification information DC2 described below.

Next, the printer driver execution unit 45b calculates a hash value for each block in the process target image data GD1 (step SA9).

These blocks and hash values are described below.

Figure 10:
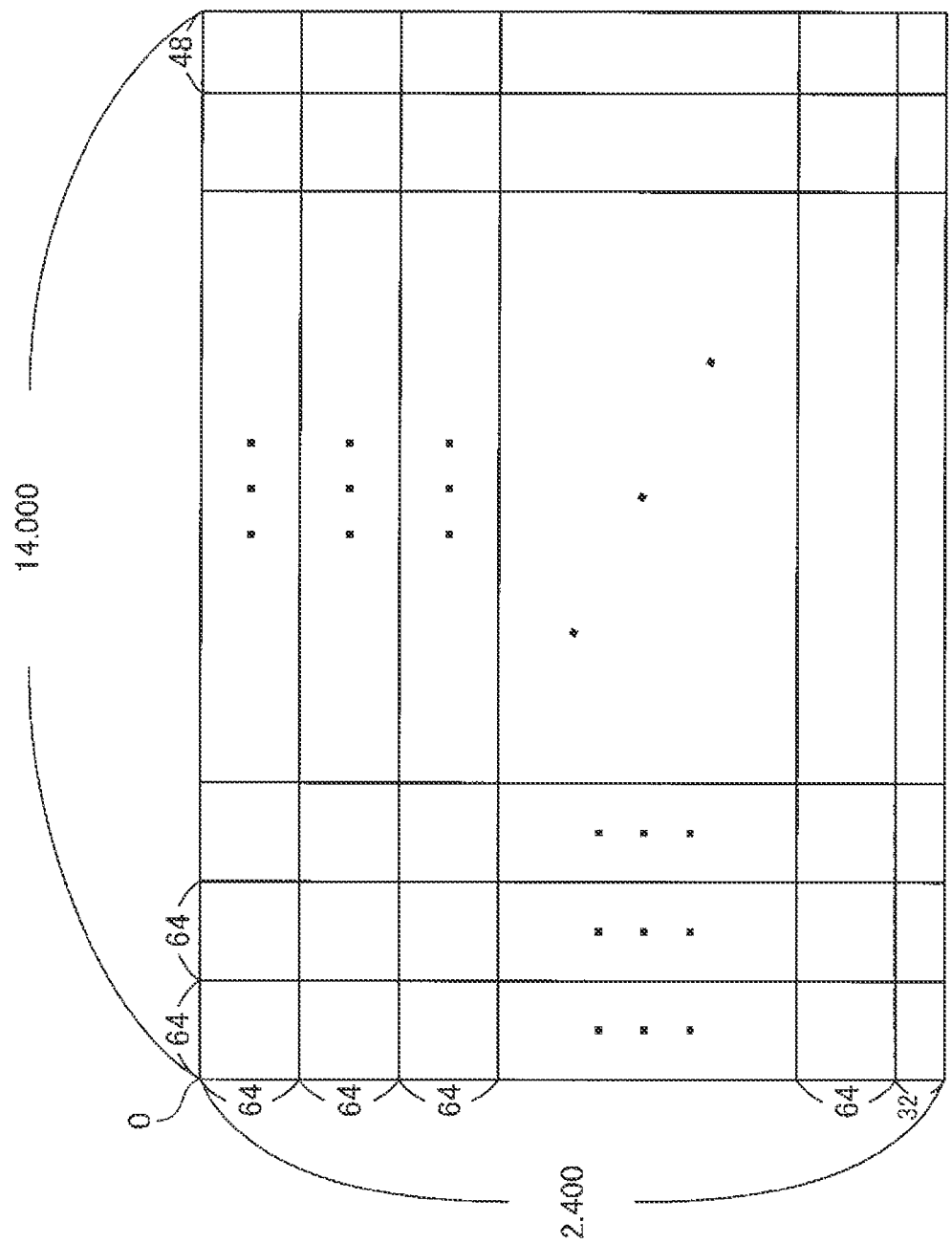
FIG. 10 shows an example of image data.

FIG. 10 shows the blocks that are formed in the process target image data GD1 superimposed over the process target image data GD1 (print image data).

In this example the process target image data GD1 is a data block 2400 dots high by 14,000 dots wide, and red (R), blue (B), and green (G) color components are stored with 256 gray scale values for each dot.

The blocks are formed by dividing the process target image data GD1 into a grid as shown in FIG. 10. More specifically, each block is an area formed by dividing the process target image data GD1 into areas 64 dots high by 64 dots wide starting from the vertex 0 at the top left corner of the process target image data GD1 as shown in FIG. 10. As a result, the basic size of one block is 64 dots high by 64 dots wide. However, because the vertical height of the process target image data GD1 is 2400 dots as seen in the figure, and 2400 is not evenly divisibly by 64, the height of each block adjacent to the bottom side of the process target image data GD1 is only 32 dots. In addition, the horizontal width of the process target image data GD1 is 14,000 dots as seen in the figure, 14,000 is also not evenly divisibly by 64, and the width of each block adjacent to the right side of the process target image data GD1 is therefore only 48 dots.

In step SA9, the printer driver execution unit 45b calculates the hash value (calculated value) of each block in the process target image data GD1 using a specific hash function (specific equation).

Location information indicating the location of the block in the process target image data GD1 is assigned to each block, and this location information enables identifying the position of each block in the image data.

In this embodiment of the invention the location information is information indicating the coordinates of the origin (the vertex at the top left corner of the block as seen in FIG. 10 in this example) of the image data in a particular block when a perpendicular coordinate system with the origin at vertex O is superimposed on the process target image data GD1.

An exemplary method of calculating the hash value for one block is described below.

One block has n dots. For a block that is 64 dots high by 64 dots wide, n=64×64=4096 dots, for example.

The printer driver execution unit 45b calculates the dot value of each of the n dots as follows.

$$\text{dot value} = (\text{gray level of red } (R) \text{ color component}) + ((\text{gray level of green } (G) \text{ color component}) \times 256) + ((\text{gray level of blue } (B) \text{ color component}) \times 65{,}536) \quad \text{Equation:}$$

The dot value of each of the n dots is $p[i]$ ($0 \leq i \leq n-1$).

Next, the printer driver execution unit 45b defines variable $h[i]$ ($0 \leq i \leq n-1$), and computes $h[n-1]$ using the following equation.

First, the printer driver execution unit 45b substitutes the value of $p[0]$ for $h[0]$.

Next, the printer driver execution unit 45b sequentially increments the value of i in ($h[i] \cdot 3 \times h[i-1] + p[i]$) from i=1 to i=n−1 to get the value of $h[n-1]$.

The printer driver execution unit 45b uses the value of $h[n-1]$ as the hash value. Note that considering the range of values that can be stored in $h[n-1]$, if the value of $h[n-1]$ exceeds value T1, the remainder of $(h[n-1])/T2$ (where T2 may equal T1) may be used as the hash value, for example.

Note that this method of calculating the hash value is only one example, and the hash value may be calculated using a different method.

After calculating the hash value of each block in the process target image data GD1 in step SA9, the printer driver execution unit 45b generates comparison image data hash J1 (step SA10). The comparison image data hash J1 is information relating the image data identification information DC of the process target image data GD1 generated in step SA5, the process target image data GD1, and the hash values of each block in the process target image data GD1 calculated in step SA9.

The process target image data GD1 contained in the comparison image data hash J1 is below referred to as the comparison image data GD2. As will be understood below, the comparison image data GD2 is the print image data that was previously selected as the process target image data GD1 from the print image data output by the application execution unit 45a.

The comparison image data hash J1 is information including the image data identification information DC of the comparison image data GD2, the comparison image data GD2, and the hash values of each block in the comparison image data GD2.

Next, the printer driver execution unit 45b stores the comparison image data hash J1 generated in step SA10 to a specific storage area (storage unit) (step SA11). This specific storage area (storage unit) may be a storage area formed in the host storage unit 48, or a storage area formed in a storage medium other than the host storage unit 48, such as working memory in RAM. Next, the printer driver execution unit 45b returns to step SA3.

As shown in FIG. 11(B), the printer control unit 27 of the printer 5 monitors whether or not control data was received from the host computer 1 (step SB1).

If control data was received (step SB1 returns YES), the printer control unit 27 reads one control data set stored in the receive buffer (step SB2). In step SB2, the printer control unit 27 sequentially reads the control data stored in the receive buffer.

Next, the printer control unit 27 determines whether or not the selected image data identification information DC2 (described below) is contained in the control data (step SB3).

As described above, selected image data identification information DC2 is not contained in the control data (control data based on the first print image data) the host computer 1 sends in step SA8. However, the selected image data identification information DC2 is included in the control data (control data based on the second or later print image data) the host computer 1 sends in step SA19.

When the selected image data identification information DC2 is not included in the control data (step SB3 returns NO), the printer control unit 27 expands the compressed process target image data GD1 contained in the control data using the expansion method corresponding to the specific compression method (step SB4).

Next, the printer control unit 27 renders the expanded process target image data GD1 in the image buffer (step SB5).

Next, the printer control unit 27 controls the printhead 12 at the appropriate timing in the appropriate way to print an image on the corresponding label S based on the image data rendered in the image buffer (step SB6).

Next, the printer control unit 27 acquires the print image data identification information DC1 (image data identification information DC) contained in the control data (step SB7).

Next, the printer control unit 27 relationally stores the print image data identification information DC1 acquired in step SB7 and the image data rendered in the image buffer in a stored image data table TB1 described below (step SB8). Below, the stored image data is referred to as stored image data GD3. This stored image data GD3 is equivalent to comparison image data.

Next, the printer control unit 27 returns toe step SB2, and reads the next control data from the receive buffer.

As shown in FIG. 9(A), when it is determined in step SA4 that the comparison image data hash J1 is stored in the specific storage area (storage unit) (step SA4 returns YES), the printer driver execution unit 45*b* executes the following process. Note that if the comparison image data hash J1 is stored in the specific storage area, the process target image data GD1 acquired in step SA3 is the second or later print image data in the print image data output by the application execution unit 45*a*.

The printer driver execution unit 45*b* then calculates the hash value of each block in the process target image data GD1 (step SA12).

Next, the printer driver execution unit 45*b* executes a hash value comparison process (step SA13).

This hash value comparison process is described below.

Figure 11:
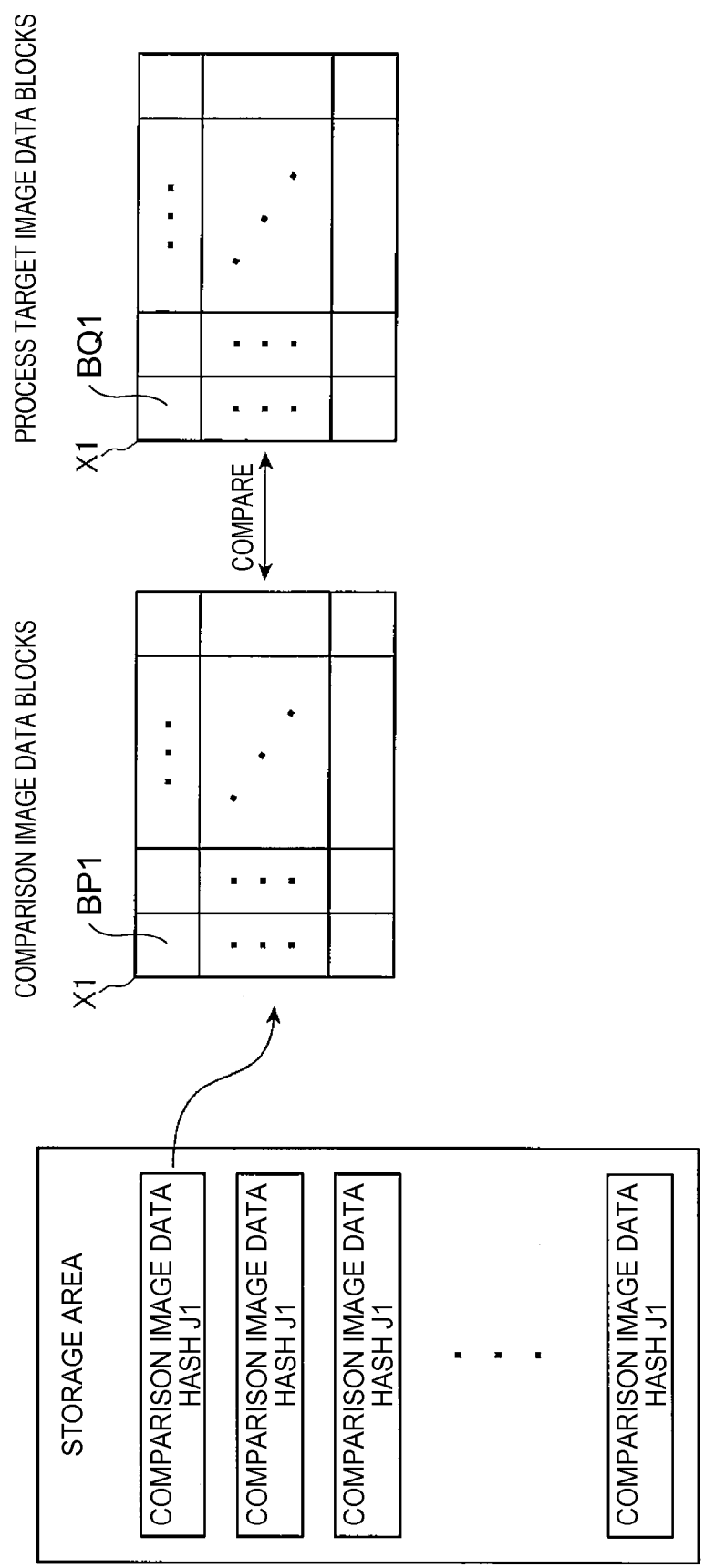
FIGS. 11(A) and 11(B) describe a hash comparison process.

FIG. 11 illustrates the hash value comparison process of step SA13.

The hash value comparison process is a process that compares the hash values of the blocks in the comparison image data GD2 contained in the one or plural comparison image data hashes J1 stored in the specific storage area with the hash values of the blocks in the process target image data GD1, and selects the comparison image data hash J1 containing the comparison image data GD2 with the fewest blocks having different hash values.

One or plural comparison image data hashes J1 are stored in the specific storage area when step SA13 executes. FIG. 11(A) shows a state in which plural comparison image data hashes J1 are stored in the specific storage area.

To describe the hash value comparison process more specifically, the printer driver execution unit 45*b* executes the following process for each of the one or plural comparison image data hashes J1.

More specifically, the printer driver execution unit 45*b* compares the hash values of the blocks in the process target image data GD1 with the hash values of the blocks of the comparison image data GD2 contained in one comparison image data hash J1, and counts the number of blocks with different hash values.

Comparing the hash values of the blocks is done by comparing the hash value of each block in the process target image data GD1 with the hash value of the block located at the corresponding position in the comparison image data GD2. FIG. 11(B) shows the blocks in the comparison image data GD2 on the left side, and the blocks in the process target image data GD1 on the right side. For example, block BP1 disposed to the position corresponding to position X1 in the comparison image data GD2, and block BQ1 disposed to the position corresponding to position X1 in the process target image data GD1, are corresponding blocks. The printer driver execution unit 45*b* therefore compares the hash value of block BP1 with the hash value of block BQ1.

For all blocks in the process target image data GD1, the printer driver execution unit 45*b* determines if the hash values of corresponding blocks in the process target image data GD1 and the selected comparison image data GD2 match, and counts the number of blocks with different hash values. The printer driver execution unit 45*b* counts the number of blocks with mismatching hash values based on comparison with all stored comparison image data GD2. Of the one or plural comparison image data hashes J1, the printer driver execution unit 45*b* then selects the comparison image data hash J1 related to the comparison image data GD2 with the fewest number of blocks with mismatching hash values.

Of the comparison image data GD2, the comparison image data GD2 with the fewest number of blocks with a different hash value than the corresponding block in the process target image data GD1 is the image data closest to the process target image data GD1.

The following process can be executed as a process that selects which if the plural comparison image data GD2 is closest to the process target image data GD1.

More specifically, corresponding dots in the comparison image data GD2 and process target image data GD1 can be compared to determine a match or mismatch, and the comparison image data GD2 with the fewest mismatching dots selected. In the hash value comparison process according to this embodiment of the invention, the printer driver execution unit 45*b* previously calculates and stores the hash value of each block in the comparison image data GD2 (image data of an image previously printed by the printer 5). The printer driver execution unit 45*b* calculates the hash value of each block in the process target image data GD1, and selects the approximate comparison image data GD2 based on comparing the hash value of each block in the process target image data GD1 with the hash value of the corresponding block in the stored comparison image data GD2. As a result, the process of selecting the comparison image data GD2 that approximates the process target image data GD1 imposes a load on the processor and requires little time for selection.

As shown in FIG. 9(A), after executing the hash value comparison process in step SA13, the printer driver execution unit 45*b* generates the image data identification information DC, which is identification information uniquely identifying the process target image data GD1 (step SA14).

Next, the printer driver execution unit 45b gets the image data identification information DC (identification information for the comparison image data GD2) contained in the comparison image data hash J1 selected in the hash value comparison process of step SA13 (step SA15). Next, the printer driver execution unit 45b executes an image data comparison process (step SA16).

The image data comparison process of step SA16 is described below.

When the hash value of a block in the process target image data GD1 is determined to match the hash value of the corresponding block in the comparison image data GD2 contained in the comparison image data hash J1 selected in the hash value comparison process in step SA13, the image data comparison process compares the dots of the image data in the associated blocks (referred to below as as block image data). The image data comparison process is also a process that identifies blocks with matching hash values must different block image data.

For example, referring to FIG. 11(B), assume that the hash value of block BP1 located at position X1 in the comparison image data GD2, and the hash value of block BQ1 located at position X1 in the process target image data GD1, match. In this event, in the image data comparison process, the printer driver execution unit 45b compares each dot in the image data (block image data) associated with block BP1 with the corresponding dot in the image data (block image data) associated with block BQ1, and determines a match or mismatch. The printer driver execution unit 45b makes this determination for each block determined to have a matching hash value, and identifies blocks that have matching hash values but different block image data.

The image data comparison process is a process with the following objective. Specifically, corresponding blocks in the process target image data GD1 and comparison image data GD2 could have matching hash values even though the corresponding block image data differs. The purpose of the image data comparison process is to identify those blocks in the process target image data GD1 with a hash value matching the hash value of the corresponding block, and block image data that is different from the block image data of the corresponding block.

Next, the printer driver execution unit 45b executes a block compression process (step SA17).

The block compression process is described below.

The block compression process compresses image data using a specific compression method. This specific compression method can compress rectangular image data, and compression efficiency increases as the size of the image data being compressed increases.

Figure 12:
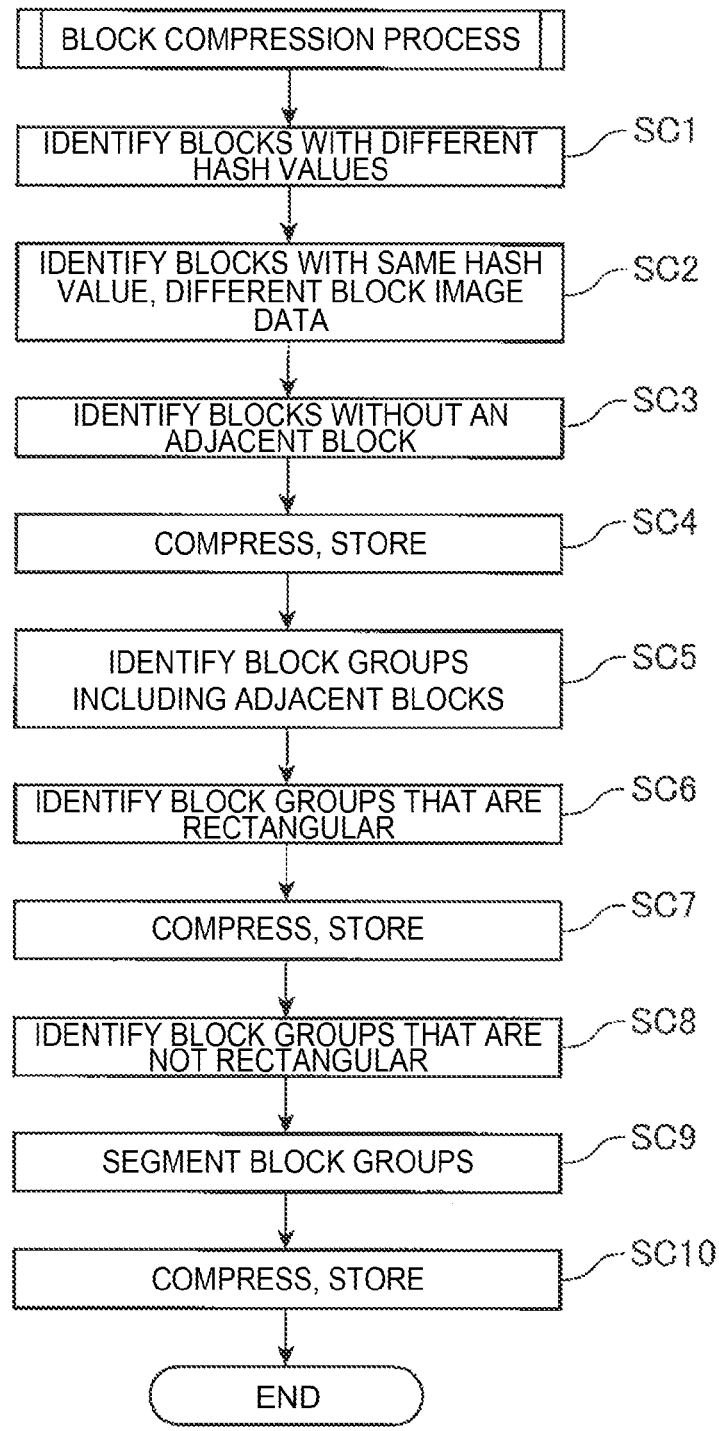
FIG. 12 illustrates the block compression process in detail.

FIG. 12 is a flow chart of the block compression process.

Figure 13A:
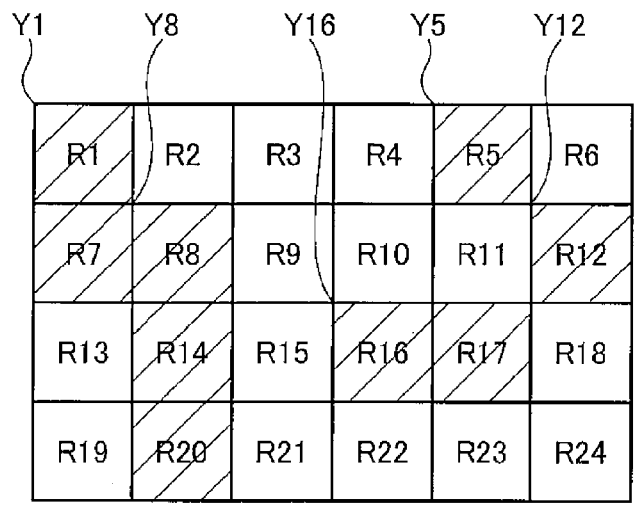
FIGS. 13(A), 13(B) and 13(C) describe a block compression process.

FIG. 13 is used to describe the block compression process. FIG. 13(A) shows the data blocks formed in the process target image data GD1. To clarify the following description, the process target image data GD1 shown in FIG. 13(A) is 4 blocks high and 6 blocks wide, and has 24 blocks labeled block R1 to block R24.

As shown in FIG. 12, the printer driver execution unit 45b first identifies the blocks in the process target image data GD1 that are determined by the hash value comparison process in step SA13 to have a different hash value than the corresponding block in the comparison image data GD2 (step SC1). Next, the printer driver execution unit 45b identifies the blocks in the process target image data GD1 that are determined by the image data comparison process in step SA16 to have a hash value that matches the corresponding block in the comparison image data GD2 but contains different block image data (step SC2).

In FIG. 13(A) the blocks identified in step SC1 and step SC2 are shaded. More specifically, blocks R1, R5, R7, R8, R12, R14, R16, R17, and R20 are the blocks identified by step SC1 and step SC2.

Next, the printer driver execution unit 45b identifies the blocks selected in step SC1 and step SC2 that are not adjacent to another selected block (step SC3). One block being adjacent to another block here means that another block contacts the top, bottom, left, or right side of the one block. In FIG. 13(A), block R16 and block R17 are adjacent. Block R5 and block R12 are not adjacent. If there are no blocks with an adjacent block, blocks are not identified by step SC3, and step SC4 is not executed.

In the example in FIG. 13(A), the printer driver execution unit 45b identifies block R5 and block R12 in step SC3.

Next, the printer driver execution unit 45b compresses the block image data of the blocks identified in step SC3 using a specific compression method, and stores the compressed block image data in the storage area relationally to location information identifying the position of the block (step SC4).

In the example in FIG. 13(A), the printer driver execution unit 45b compresses the block image data of block R5, and relationally stores the compressed block with location information indicating position Y5. The printer driver execution unit 45b also compresses the block image data of block R12, and relationally stores the compressed block with location information indicating position Y12.

Next, the printer driver execution unit 45b identifies units of blocks composed of adjacent blocks in the blocks identified in steps SC1 and SC2 (step SC5).

Figure 13B:
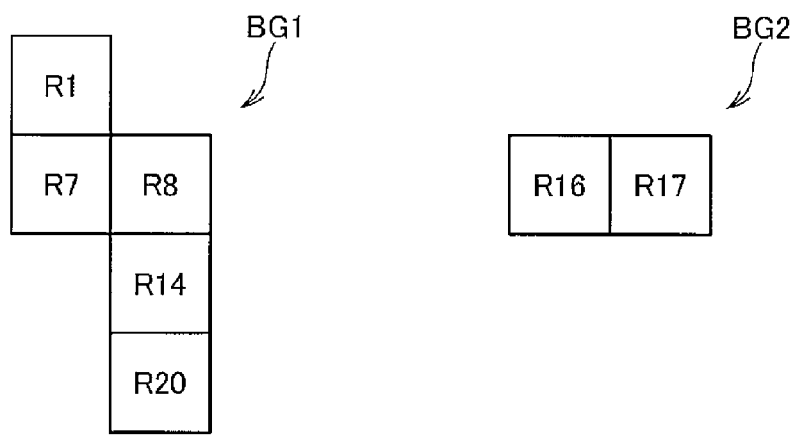

In the example in FIG. 13(A), the printer driver execution unit 45b identifies block group BG1 including blocks R1, R7, R8, R14, and R20 (also see FIG. 13(B)), and block group BG2 including block R16 and block R17 (see also FIG. 13(B)).

If there are no such groups of blocks, a block unit is not identified in step SC5, and step SC6 to step SC10 are skipped.

Next, the printer driver execution unit 45b finds any rectangular block units in the groups of blocks identified in step SC5 (step SC6).

In the example in FIG. 13(A), the printer driver execution unit 45b identifies block group BG2 as a rectangular block unit. If there are no rectangular block units, a rectangular block unit is not identified in step SC6 and step SC7 does not execute.

Next, the printer driver execution unit 45b compresses the image data associated with the rectangular block groups identified in step SC6 as a single block of image data using a specific compression method. The printer driver execution unit 45b stores the image data associated with the compressed block groups relationally to location information identifying the position of the block group in the storage area (step SC7).

In the example in FIG. 13(A), the printer driver execution unit 45b compresses the image data associated with the block group BG2 as a single block of image data using a specific compression method. The printer driver execution unit 45b then stores the image data associated with the compressed block group BG2 relationally to location information indicating position Y16.

Next, the printer driver execution unit 45b identifies the block groups found in step SC5 that are not rectangular groups of blocks (step SC8).

In the example in FIG. 13(A), the printer driver execution unit 45*b* identifies block group BG1 as a group of blocks that is not rectangular. If a group of blocks that is not rectangular is not found, a rectangular group of blocks that is not rectangular is not identified in step SC8, and step SC9 and step SC10 are not executed.

Next, the printer driver execution unit 45*b* segments the non-rectangular block groups identified in step SC8 into rectangular block units or individual blocks (step SC9). Below, the rectangular block units and individual blocks that are segmented in step SC9 are collectively referred to below as "segmented blocks."

In this segmentation process, the printer driver execution unit 45*b* segments the non-rectangular block groups in a way that increases the compression efficiency appropriately to the specific compression method used when the image data is compressed after segmentation using the specific compression method. For example, if the image data can be compressed more efficiently when the block groups are as large as possible after segmentation, the block groups are segmented to create the largest possible groups of blocks. If image data compression efficiency is higher when the number of segmented blocks is smaller, the block groups are segmented to reduce the number of segmented blocks.

Figure 13C:
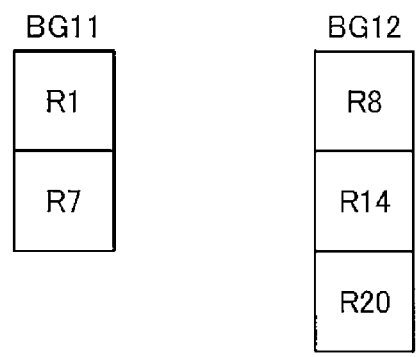

In the example in FIG. 13(A), the printer driver execution unit 45*b* segments block group BG1 into block group BG11 containing block R1 and block R7 (see FIG. 13(C)), and block group BG12 including blocks R8, R14, and R20 (see FIG. 13(C)).

Next, the printer driver execution unit 45*b* compresses the image data associated with each segmented block using a specific compression method. If the segmented block contains plural blocks, the image data of the plural blocks is compressed as a single image data unit using the specific compression method. The printer driver execution unit 45*b* then stores the image data of each compressed segmented block in the storage area relationally to location information identifying the position of the segmented block (step SC10).

In the example in FIG. 13(A), the printer driver execution unit 45*b* compresses the image data associated with block group BG1 as a single unit of image data using the specific compression method. The printer driver execution unit 45*b* stores the image data associated with the compressed block group BG11 relationally to location information indicating position Y1. The printer driver execution unit 45*b* also compresses the image data associated with block group BG12 as a single unit of image data using the specific compression method. The printer driver execution unit 45*b* stores the image data associated with the compressed block group BG12 relationally to location information indicating position Y8.

Because this method compresses the image data associated with each block, compression with high efficiency is possible.

As shown in FIG. 9(A), the printer driver execution unit 45*b* generates control data after the block compression process in step SA17 (step SA18).

The control data generated in step SA18 includes the image data identification information DC (identification information for the process target image data GD1) produced in step SA14. The image data identification information DC representing the identification information of the process target image data GD1 contained in the control data is the print image data identification information DC1.

The control data produced in step SA18 includes the image data identification information DC (identification information for the comparison image data GD2) included in the comparison image data hash J1 selected by the hash value comparison process in step SA13. Below, the image data identification information DC representing the identification information of the comparison image data GD2 included in the control data is referred to as the selected image data identification information DC2, and is differentiated from the print image data identification information DC1.

The control data generated in step SA18 includes the image data of the blocks compressed by the block compression process of step SA17, or a combination of the image data in the block group and location information indicating the position of the image data.

In the example in FIG. 13(A), the printer driver execution unit 45*b* includes the combination of the compressed image data of block R5 and location information indicating position Y5, the combination of the compressed image data of block R12 and location information indicating position Y12, the combination of the compressed image data of block group BG2 and location information indicating position Y16, the combination of the compressed image data of block group BG11 and location information indicating position Y1, and the combination of the compressed image data of block group BG12 and location information indicating position Y8 in the control data.

Next, the printer driver execution unit 45*b* controls the communication interface 49 to output the control data (step SA19).

In this way, the control data does not include all of the process target image data GD1, and instead includes the image data of blocks for which the hash value differs from the corresponding blocks in the comparison image data GD2, and blocks for which the hash values match but the block image data differs. As a result, the amount of control data can be reduced.

Next, the printer driver execution unit 45*b* determines whether or not transmission of control data based on all print image data the application execution unit 45*a* output has been completed (step SA20). If transmission has been completed (step SA20 returns YES), the printer driver execution unit 45*b* ends the process. If transmission is not complete (step SA20 returns NO), the printer driver execution unit 45*b* generates and stores a comparison image data hash J1 based on the process target image data GD1 in a specific storage area (storage unit) (step SA21).

The stored comparison image data hash J1 generated in step SA21 is information related to the image data identification information DC of the process target image data GD1 generated in step SA14, the process target image data GD1 as the comparison image data GD2, and the hash values of each block in the process target image data GD1 as the comparison image calculated in step SA12.

Next, the printer driver execution unit 45*b* returns to step SA3.

As shown in FIG. 9(B), the printer control unit 27 of the printer 5 monitors whether or not control data was received from the host computer 1 (step SB1).

If control data was received (step SB1 returns YES), the printer control unit 27 reads one unit of control data stored in the receive buffer (step SB2).

Next, the printer control unit 27 determines whether or not the selected image data identification information DC2 (described below) is included in the control data (step SB3).

As described above, the selected image data identification information DC2 is included in the control data (control data based on the second or later print image data) the host computer 1 sends in step SA19.

If the selected image data identification information DC2 is included in the control data (step SB3 returns YES), the printer control unit 27 references the stored image data table TB1 stored by the printer storage unit 50 (step SB9).

The stored image data table TB1 is a table relationally storing the stored image data GD3 described below (comparison image data) and the image data identification information DC of the stored image data GD3. The method of generating records in the stored image data table TB1 is described below. In this embodiment of the invention, the stored image data GD3 is stored in the printer storage unit 50 as the device storage unit, but a configuration storing the stored image data GD3 in another storage medium is also conceivable. In this event, the other storage medium is equivalent to the device storage unit.

Next, the printer control unit 27 acquires the selected image data identification information DC2 contained in the control data (step SB10).

Next, the printer control unit 27 retrieves the stored image data GD3 related to the identification information from the stored image data table TB1 stored by the printer storage unit 50 using the selected image data identification information DC2 acquired in step SB10 as the search key (step SB11).

As will be understood below, the stored image data GD3 acquired in step SB11 is the same image data as the comparison image data GD2 included in the comparison image data hash J1 the host computer 1 selected in the hash value comparison process of step SA13.

Next, the printer control unit 27 renders the stored image data GD3 acquired in step SB11 in the image buffer (step SB12).

Next, the printer control unit 27 expands the compressed image data contained in the control data (step SB13).

Next, the printer control unit 27 overwrites the expanded image data to the positions indicated by the location information of the image data in the stored image data GD3 rendered in the image buffer (step SB14).

The operation of this step SB14 is further described below.

FIG. 14 is used to describe the process of step SB14.

This process is described below with reference to FIG. 13 and assumes the combination of the compressed image data of block R5 and location information indicating position Y5, the combination of the compressed image data of block R12 and location information indicating position Y12, the combination of the compressed image data of block group BG2 and location information indicating position Y16, the combination of the compressed image data of block group BG11 and location information indicating position Y1, and the combination of the compressed image data of block group BG12 and location information indicating position Y8 are included in the control data. In step SB13, the printer control unit 27 expands the compressed image data contained in the control data.

Figure 14A:
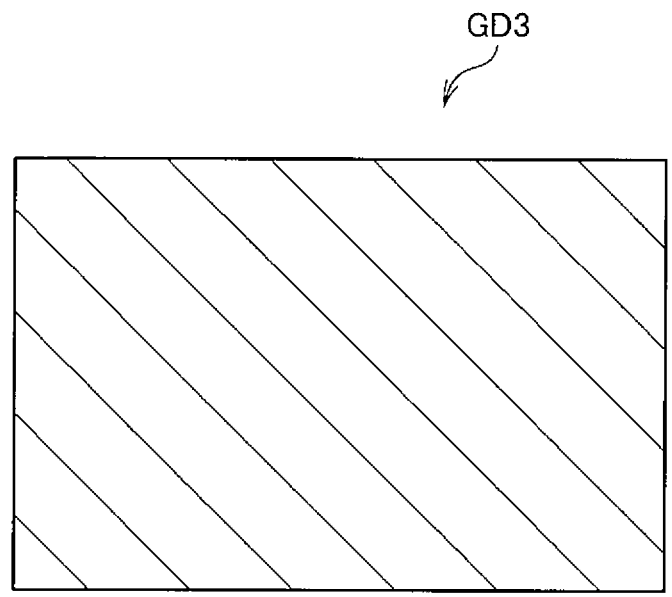
FIGS. 14(A) and 14(B) describe printing based on image data stored in a buffer.

FIG. 14(A) schematically shows the stored image data GD3 rendered in the image buffer by the process of step SB12.

Figure 14B:
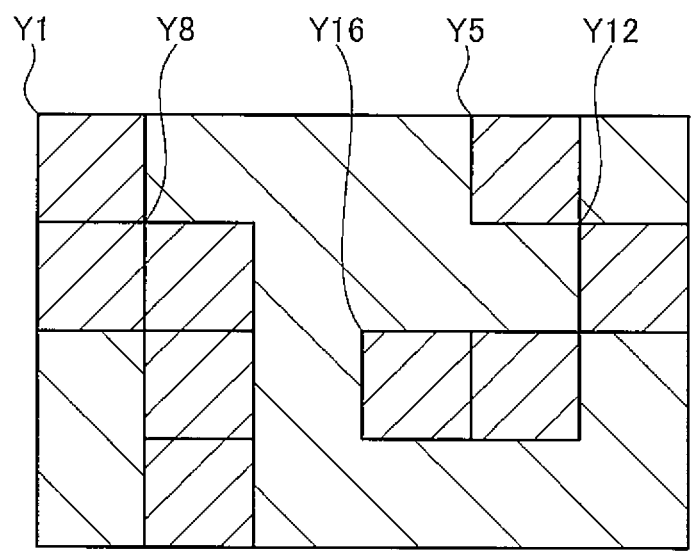

In step SB14, the printer control unit 27 superimposes the expanded image data on the stored image data GD3 stored in the image buffer at the positions indicated by the location information corresponding to the image data. More specifically, as shown in FIG. 14(B), the printer control unit 27 writes the image data for block R5 to the position corresponding to position Y5 in the stored image data GD3 rendered in the image buffer.

The printer control unit 27 also writes the image data for block R12 to the position corresponding to position Y12 in the stored image data GD3 rendered in the image buffer.

The printer control unit 27 also writes the image data for block group BG2 to the position corresponding to position Y16 in the stored image data GD3 rendered in the image buffer.

The printer control unit 27 also writes the image data for block group BG11 to the position corresponding to position Y1 in the stored image data GD3 rendered in the image buffer.

The printer control unit 27 also writes the image data for block group BG12 to the position corresponding to position Y8 in the stored image data GD3 rendered in the image buffer.

The stored image data GD3 after the decompressed image data has been overwritten thereto (referred to below as the post-superimposition image data GD4) is the same image data as the process target image data GD1 that was the basis for generating the control data read in step SA2. The reason is described below.

As described above, the host computer 1 selects the comparison image data GD2 that most closely approximates the process target image data GD1 from the comparison image data GD2 stored in memory, identifies blocks with different hash values or blocks with the same hash values but different block image data, and outputs the image data of the identified blocks. Using the identification information as the search key, the printer 5 then selects the stored image data GD3 (comparison image data) that is the same as the comparison image data GD2 selected by the host computer 1 from the plural stored image data GD3 (comparison image data) stored in memory. The printer 5 then superimposes the image data of the received blocks to corresponding positions in the selected stored image data GD3, and generates the post-superimposition image data GD4. As a result, the post-superimposition image data GD4 is image data in which the differences between the comparison image data GD2 and the process target image data GD1 are superimposed on the comparison image data GD2, and is therefore image data identical to the process target image data GD1.

Next, the printer control unit 27 prints an image on the corresponding label S based on the post-superimposition image data GD4 rendered in the image buffer (step SB15). The image printed on the label S in step SB15 is the image expressed by the corresponding print image data output by the application execution unit 45a.

Next, the printer control unit 27 extracts the print image data identification information DC1 contained in the control data (step SB16).

Next, the printer control unit 27 generates one record in the stored image data table TB1 stored by the printer storage unit 50, and relationally stores the print image data identification information DC1 acquired in step SB16 with the post-superimposition image data GD4 in this record (step SB17). The post-superimposition image data GD4 stored in step SB17 is equivalent to the stored image data GD3.

The combination of the process target image data GD1 and the image data identification information DC contained in the comparison image data hash J1 stored by the host computer 1 in step SA21, and the combination of the print image data identification information DC1 and post-superimposition image data GD4 relationally stored in the stored image data table TB1, match here.

Next, the printer control unit 27 determines whether or not printing based on all control data is completed (step SB18). If printing is completed (step SB18 returns YES), the printer control unit 27 ends the process. If printing is not completed (step SB18 returns NO), the printer control unit 27 returns to step SB2.

As described above, the printing system 8 according to this embodiment of the invention has a printer 5 (printing device) and a host computer 1 (control device).

The host computer 1 has a storage unit that stores a hash value (calculated value) computed using a specific hash function (specific equation) from each block into which comparison image data GD2, which is image data used for comparison, is divided; and a host control unit 45 that, for each block in print image data, which is the image data of the image to be printed by the printer 5, calculates a hash value using a specific hash function, compares the hash values of corresponding blocks in the comparison image data GD2 and the print image data, and sends control data containing the image data of blocks of the print image data that have different hash values.

The printer 5 includes a printhead 12 (print unit); a printer storage unit 50 that stores stored image data GD3 (comparison image data), which is image data corresponding to the comparison image data GD2 stored by the host computer 1; and a printer control unit 27 (device control unit) that, when control data is received, prints an image with the printhead 12 based on the stored image data GD3 stored in the printer storage unit 50 and the image data of blocks contained in the control data.

In order to print an image with the printer 5 in this configuration, the host computer 1 can simply send blocks of the print image data of the image to be printed that have a different calculated value than the corresponding block in the stored comparison image data GD2 to the printer, and the amount of data sent from the host computer 1 to the printer 5 can be reduced.

The host control unit 45 of the host computer 1 in this embodiment of the invention sends control data including image data of blocks with different hash values, and location information identifying the position of the blocks in the comparison image data GD2, to the printer 5. When control data is received, the printer control unit 27 of the printer 5 superimposes the image data of the corresponding blocks contained in the control data to the position indicated by the location information contained in the control data on the stored image data GD3 (comparison image data) stored by the printer storage unit 50, and prints an image with the printhead 12 based on the post-superimposition image data GD4 (comparison image data after data is overwritten).

This configuration enables the printing device to print a desired image based on the stored stored image data GD3 and the image data of blocks received from the host computer 1.

For one or a plurality of comparison image data GD2, the storage unit of the host computer 1 (such as the host storage unit 48) in this embodiment of the invention relationally stores the calculated value of a block in the comparison image data GD2 with image data identification information DC (identification information) identifying the comparison image data GD2.

The printer storage unit 50 of the printer 5 relationally stores one or a plurality of stored image data GD3 (comparison image data) with identification information for the stored image data GD3.

The host control unit 45 of the host computer 1 compares the calculated values of corresponding blocks in the print image data and the one or plural comparison image data GD2; selects the comparison image data GD2 with the fewest blocks having different calculated values; and sends control data including the image data identification information DC of the selected comparison image data GD2, and the image data of blocks of the print image data that have a calculated value that is different from the corresponding block in the selected comparison image data GD2, to the printer 5. The printer control unit 27 of the printer 5 then prints an image with the printhead 12 based on the stored image data GD3 that is stored by the printer storage unit 50 relationally to the image data identification information DC included in the control data, and the image data of the blocks contained in the control data.

In this configuration, the host computer 1 compares the hash values of corresponding blocks in the print image data and the one or plural comparison image data GD2, and determines the comparison image data GD2 having the fewest blocks with different hash values. Because the comparison image data GD2 is selected in this way, the host computer 1 can identify the comparison image data GD2 that approximates the print image data by the simple means of comparing calculated values of the blocks.

In addition, because the comparison image data GD2 is selected as described above, the processing load is lower and less time is required to make a decision than when the individual dots of the print image data and the individual dots of the comparison image data GD2 are compared to select the closest comparison image data GD2.

Furthermore, the host computer 1 in this configuration can report the selected image data to the printer 5 using the image data identification information DC. The printer 5 can then determine the comparison image data GD2 selected by the host computer 1 from the stored stored image data GD3 (comparison image data) based on the received identification information, and can print an image based on the identified stored image data GD3 and the received block image data.

The host control unit 45 of the host computer 1 in this embodiment of the invention sends plural control data continuously to the printer 5. Based on the plural control data received from the host computer 1, the printer control unit 27 of the printer 5 continuously prints images corresponding to the control data. To generate one set of control data, the host control unit 45 of the host computer 1 generates print image data for the image to be printed by the one set of control data; calculates a hash value for each block in the generated print image data; compares the hash values of corresponding blocks in the generated print image data and the one or plural comparison image data GD2; selects the comparison image data GD2 having the fewest blocks with different hash values; generates image data identification information DC (print image data identification information DC1) for the generated print image data; sends control data including the image data identification information DC (selected image data identification information DC2) of the selected comparison image data GD2, the generated print image data identification information DC1, and the image data of blocks in the print image data that have a different calculated value than the corresponding block in the selected comparison image data GD2, to the printer 5; and stores the calculated hash value of the block in the print image data as the hash value of the corresponding block in the comparison image data GD2 relationally to the generated print image data identification information DC1.

When control data is received, the printer control unit 27 of the printer 5 prints the image of the print image data based on the control data, and stores the image data of the printed image (post-superimposition image data GD4) as comparison image data relationally to the print image data identification information DC1 contained in the control data.

In this configuration, the host computer 1 cumulatively stores the hash values of the blocks of the image data for images to be continuously printed by the printer 5 as the hash values of blocks in the comparison image data GD2 relationally to the image data identification information DC. The printer 5 also cumulatively stores the image data of the printed images as comparison image data relationally to image data identification information DC. Because the host computer 1 can continuously send plural control data to the printer 5, and the printer 5 can continuously print images corresponding to the control data based on the plural control data received from the host computer 1 in this configuration, the host computer 1 can cumulatively store the comparison image data GD2, and the printer 5 can store image data GD3 (comparison image data) appropriately to the host computer 1.

The host control unit 45 of the host computer 1 in this embodiment of the invention compares the hash values of corresponding blocks in the comparison image data GD2 and the print image data, compares the image data of corresponding blocks in the print image data and the comparison image data GD2 that have the same hash values, and includes the image data of the blocks with the same hash values in the control data if the image data of the blocks differ.

The hash value is a value calculated from the block using a specific hash function, and there are situations in which the content of the image data in each block can differ even though the calculated value of the block in the comparison image data GD2 and the calculated value of the block in the print image data are the same.

In this embodiment of the invention, the host computer 1 can include the image data of blocks in the print image data in the control data when the content of the image data in the blocks is different even if the calculated value of a block in the comparison image data GD2 and the calculated value of the corresponding block in the print image data are the same.

In this embodiment of the invention the host control unit 45 of the host computer 1 is characterized by compressing and including the image data of blocks in the control data that the host control unit 45 sends to the printer 5.

Thus comprised, the amount of data sent from the host computer 1 to the printer 5 can be further reduced.

When transmitting image data for plural blocks in this embodiment of the invention, the host control unit 45 of the host computer 1 combines the image data from adjacent blocks, determines if the combined image data can be compressed, and if compression is possible, combines the image data from adjacent blocks, compresses and inserts the combined image data in the control data, and sends the control data to the printer 5.

Thus comprised, the amount of data sent from the host computer 1 to the printer 5 can be more efficiently reduced.

Some embodiments of the invention is described above with reference to a preferred embodiment thereof, but the invention is not limited thereto and can be modified and adapted in many ways without departing from the scope of the accompanying claims.

The host computer 1 and the printer 5 in the foregoing embodiment are configured to cumulatively store print image data based on the image data of images printed continuously to plural labels S. However, a configuration in which each device previously stores specific image data as the comparison image data is also conceivable.

The foregoing embodiment describes a configuration in which the printer 5 stores the post-superimposition image data GD4 as the comparison image data. Alternatively, a configuration in which the printer 5 stores the image data of the blocks contained in the control data as the comparison image data is also conceivable.

Yet further, the application execution unit 45*a* is configured to generate the print image data in the foregoing embodiment, but a configuration in which the printer driver execution unit 45*b* generates the print image data is also conceivable.

A configuration in which the processes described in the foregoing embodiment are executed in a specific operating mode is also conceivable.

Embodiment 3

The block compression process (step SA17) in the second embodiment described above is replaced by the process described below in this embodiment of the invention.

The block compression process compresses image data according to a specific compression method. This specific compression method can compress rectangular image data, and compression efficiency increases as the size of the image data being compressed increases.

Figure 15:
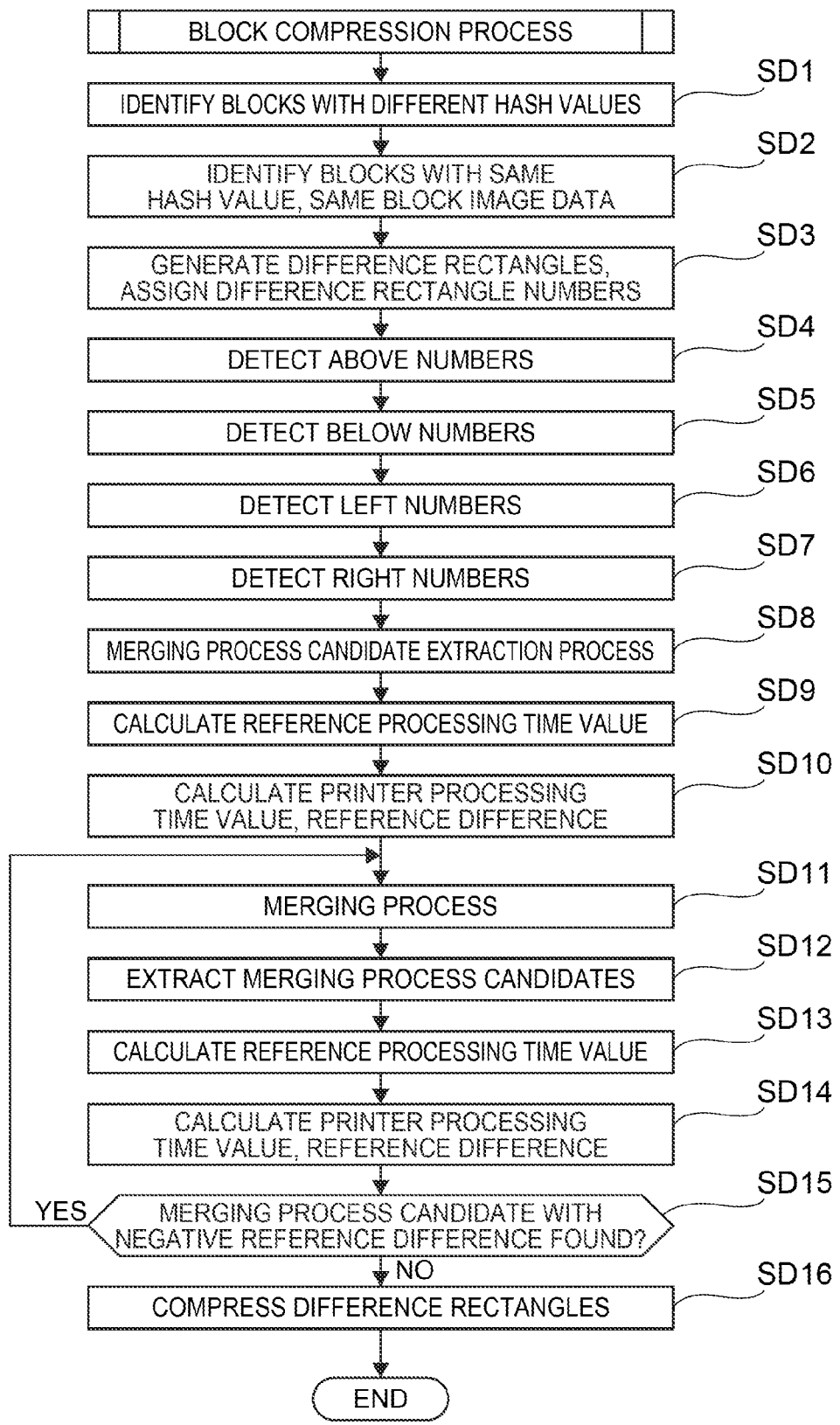
FIG. 15 is a flow chart of the block compression process.

FIG. 15 is a flow chart showing the block compression process in detail.

Figures 16A, 16B, 16C:
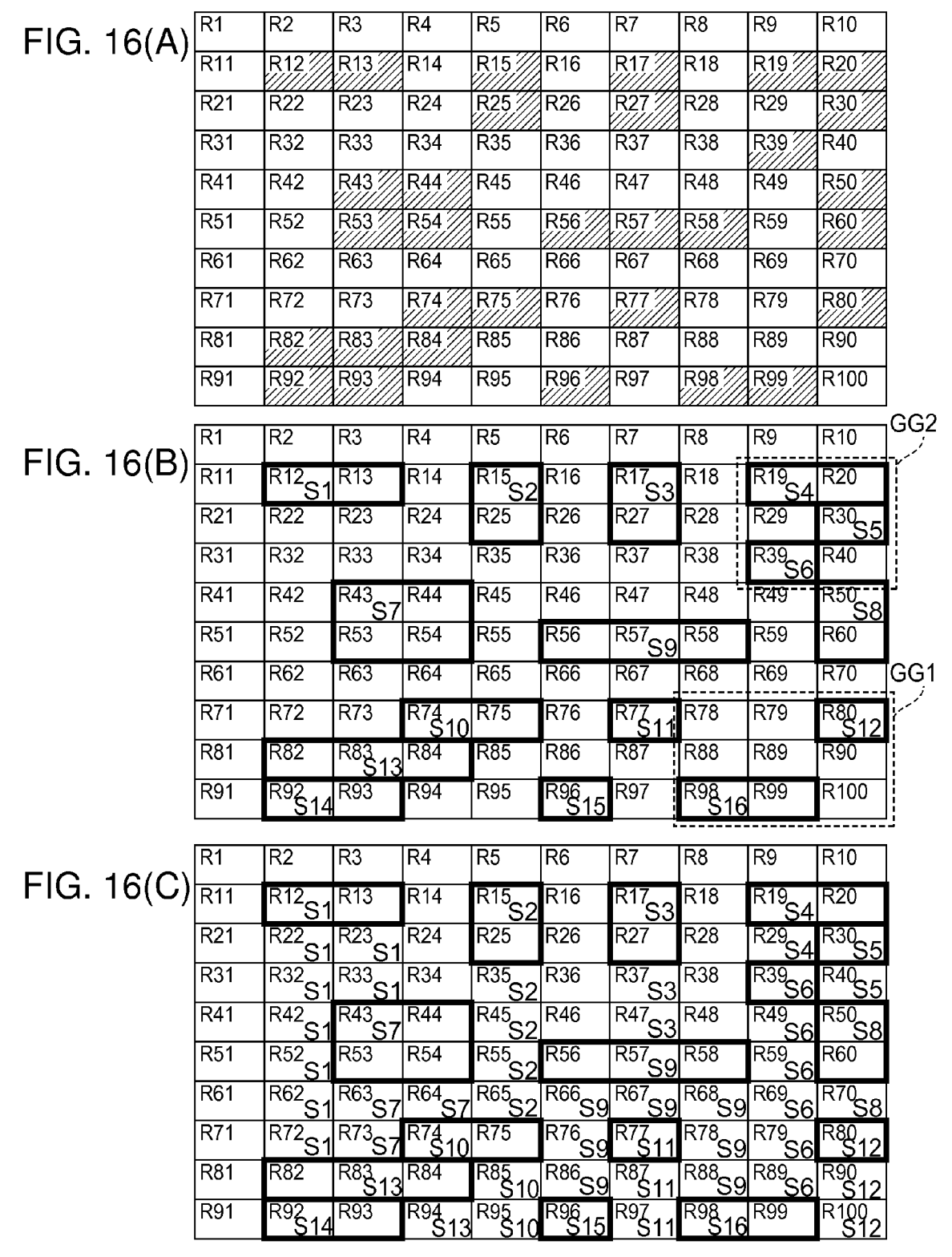

FIG. 16 is used to describe the block compression process. FIG. 16(A) shows the data blocks formed in the process target image data GD1. To clarify the following description, the process target image data GD1 shown in FIG. 16(A) is 10 blocks high and 10 blocks wide, and has 100 blocks labeled block R1 to block R100 (referred to below as block numbers). Note that the block numbers increase from top to bottom vertically and increase from left to right horizontally as shown in the figure.

As shown in FIG. 15, the printer driver execution unit 45*b* first identifies the blocks in the process target image data GD1 that are determined by the hash value comparison process in step SA13 to have a different hash value than the corresponding block in the comparison image data GD2 (step SD1). Next, the printer driver execution unit 45*b* identifies the blocks in the process target image data GD1 that are determined by the image data comparison process in step SA16 to have a hash value that matches the corresponding block in the comparison image data GD2 but contains different block image data (step SD2).

The blocks identified in step SD1 and step SD2 are referred to below as "difference blocks."

The difference blocks are shaded in FIG. 16(A). More specifically, the blocks of block numbers R12, R13, R15, R17, R19, R20, R25, R27, R30, R39, R43, R44, R50, R53, R54, R56, R57, R58, R60, R74, R75, R77, R80, R82, R83, R84, R92, R93, R96, R98, R99 are difference blocks.

Next, the printer driver execution unit 45*b* joins adjacent difference blocks and creates difference rectangles, and assigns an identification number (referred to below as a "difference rectangle number") to each difference rectangle (step SD3). When a difference block does not have an adjacent difference block, the one difference block is handled as a difference rectangle.

FIG. 16(B) illustrates difference rectangles created by the process of step SD3 from the difference blocks shown in FIG. 16(A).

In the example shown in FIG. 16(B), 16 difference rectangles are created, and difference rectangle number S1 to difference rectangle number S16 are assigned to the difference rectangles.

Next, the printer driver execution unit 45*b* detects the difference rectangle number of the difference rectangle that is closest vertically above each block that is not a difference rectangle (referred to below as "no-difference blocks"), and records the detected difference rectangle number relationally to the block number of the no-difference block (step SD4). The no-difference blocks are the blocks that are not shaded in the example shown in FIG. 16(A).

FIG. 16(C) illustrates detecting the difference rectangle numbers of the difference rectangles that are closest vertically above the no-difference blocks shown in FIG. 16(A) by the detection process of step SD4. FIG. 16(C) shows the difference rectangle numbers detected in step SD4 in the rectangles representing the no-difference blocks.

As shown in FIG. 16(C), S1 is detected as the difference rectangle number of the difference rectangle that is closest vertically above the no-difference block of block number R22. S1 is also detected as the difference rectangle number of the difference rectangle that is closest vertically above the no-difference block of block number R23. S2 is detected as the difference rectangle number of the difference rectangle that is closest vertically above the no-difference block of block number R55.

As also shown in FIG. 16(C), when a difference rectangle is not vertically above a no-difference block, a difference rectangle number of a difference rectangle that is closest vertically above a no-difference block is not detected.

Next, the printer driver execution unit 45b detects the difference rectangle number of the difference rectangle that is closest vertically below each no-difference block, and stores the detected difference rectangle number relationally to the block number of the no-difference block (step SD5).

Figures 17A, 17B, 17C:
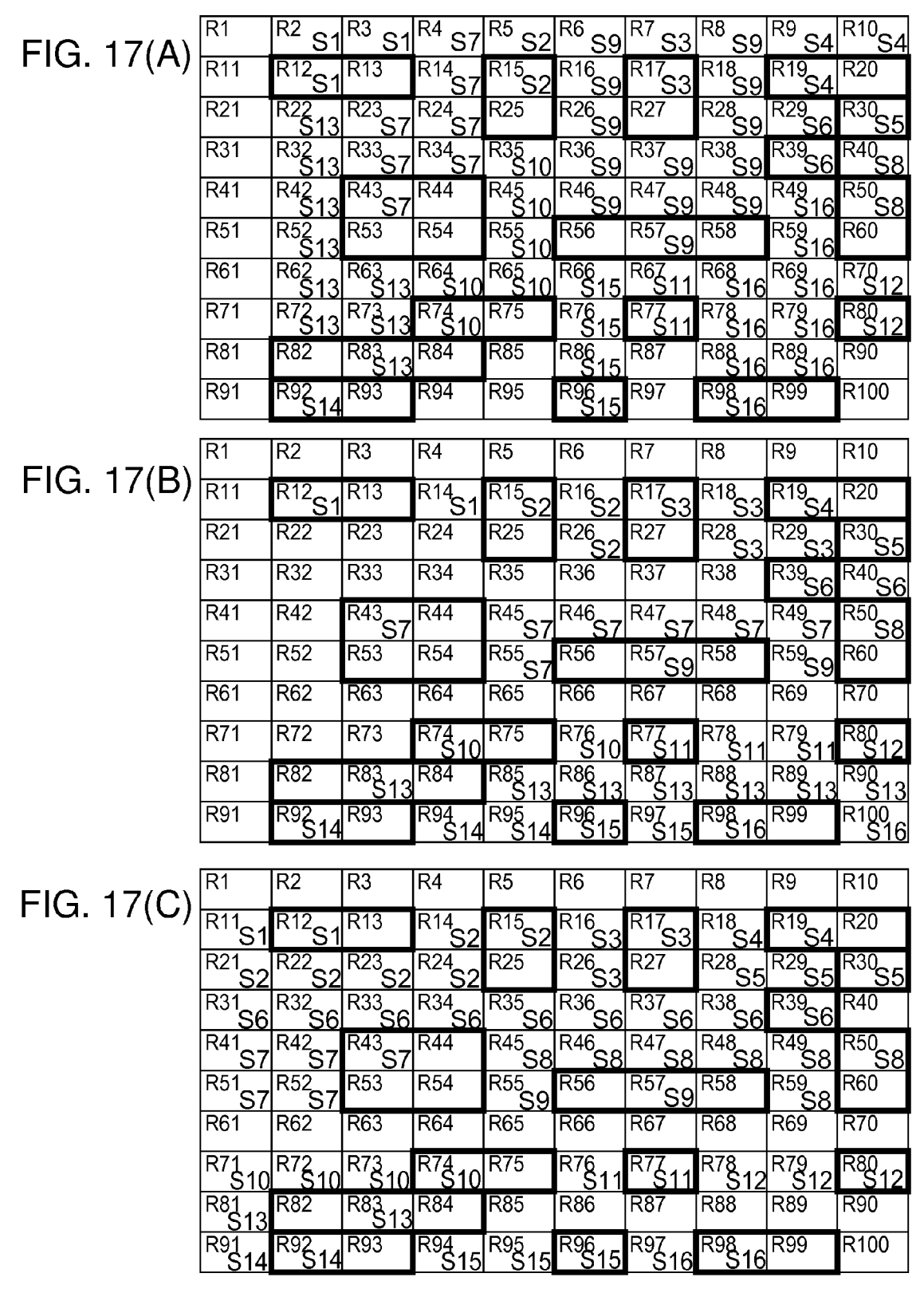

FIG. 17(A) shows the difference rectangle numbers detected by the process of step SD5 for the difference rectangles that are closest vertically below each no-difference block shown in FIG. 16(A).

Next, the printer driver execution unit 45b detects the difference rectangle number of the difference rectangle that is closest on the left side of each no-difference block, and stores the detected difference rectangle number relationally to the block number of the no-difference block (step SD6).

FIG. 17(B) shows the difference rectangle numbers detected by the process of step SD6 for the difference rectangles that are closest on the left side of each no-difference block shown in FIG. 16(A).

Next, the printer driver execution unit 45b detects the difference rectangle number of the difference rectangle that is closest on the right side of each no-difference block, and stores the detected difference rectangle number relationally to the block number of the no-difference block (step SD7).

FIG. 17(C) shows the difference rectangle numbers detected by the process of step SD7 for the difference rectangles that are closest on the right side of each no-difference block shown in FIG. 16(A).

Next, the printer driver execution unit 45b executes a merging process candidate extraction process (step SD8) based on the results of step SD4 to step SD7.

The merging process candidate extraction process is described in detail below.

In the merging process candidate extraction process the printer driver execution unit 45b extracts combinations of difference rectangle numbers of two difference rectangles (referred to below as "merging process candidates") that may be objects processed by the merging process described below based on the no-difference blocks.

A difference rectangle number detected for a no-difference block in the process of step SD4 is referred to herein as an "above number." A difference rectangle number detected for a no-difference block in the process of step SD5 is referred to as a "below number." A difference rectangle number detected for a no-difference block in the process of step SD6 is referred to as a "left number." A difference rectangle number detected for a no-difference block in the process of step SD7 is referred to as a "right number." Collectively, above numbers, below numbers, left numbers, and right numbers are referred to as "adjacent difference rectangle numbers."

In the merging process candidate extraction process, the printer driver execution unit 45b sequentially selects and processes one at a time no-difference blocks for which two or more adjacent difference rectangle numbers are detected.

For example, when the no-difference block of block number R100 is selected for processing, the printer driver execution unit 45b executes the following process.

The printer driver execution unit 45b retrieves all adjacent difference rectangle numbers detected for the no-difference block of block number R100. As shown in FIG. 16(C), and FIG. 17(A) to (C), S12 is detected as the above number and S16 is detected as the left number of no-difference block R100. The printer driver execution unit 45b therefore acquires S12 and S16 as the adjacent difference rectangle numbers.

Next, the printer driver execution unit 45b extracts the combination of the acquired two adjacent difference rectangle numbers as a merging process candidate. The merging process candidate extracted in this step identifies a combination of two difference rectangles that can be joined as a new difference rectangle by the merging process.

The merging process is a process that creates the smallest rectangles of image data (new difference rectangles) including two difference rectangles. More specifically, as shown in FIG. 16(B), the difference rectangle of difference rectangle number S12, and the difference rectangle of difference rectangle number S16 can be joined by the merging process into a new difference rectangle GG1 including blocks of block numbers R78, R79, R80, R88, R89, R90, R98, R99, R100.

One merging process candidate is thus extracted for a no-difference block for which two adjacent difference rectangle numbers are detected.

For example, the printer driver execution unit 45b executes the following process when the no-difference block R22 is selected for processing. That is, the printer driver execution unit 45b retrieves all adjacent difference rectangle numbers detected for the no-difference block of block number R22. As shown in FIG. 16(C), and FIG. 17(A) to (C), S1 is detected as the above number, S13 is detected as the below number, and S2 is selected as the right number for no-difference block R22. The printer driver execution unit 45b therefore retrieves S1, S2, and S13.

Next, based on the three acquired adjacent difference rectangle numbers, the printer driver execution unit 45b extracts the combination of S1 and S2, the combination of S1 and S13, and the combination of S2 and S13, that is, extracts three combinations (3C2=3), as the merging process candidates. The merging process candidates extracted in this step are combinations of two difference rectangles that can be merged as a new difference rectangle by the merging process described below.

Three merging process candidates are thus extracted for a no-difference block for which three adjacent difference rectangle numbers are detected.

In another example, when the no-difference block of block number R55 is selected, the printer driver execution unit 45b executes the following process. That is, the printer driver execution unit 45b retrieves all adjacent difference rectangle numbers detected for the no-difference block of block number R55. As shown in FIG. 16(C), and FIG. 17(A) to (C), S2 is detected as the above number, S10 is detected as the below number, S7 is detected as the left number, and S9 is detected as the right number for no-difference block R55. The printer driver execution unit 45*b* therefore retrieves S2, S7, S9 and S10.

Next, based on the four acquired adjacent difference rectangle numbers, the printer driver execution unit 45*b* extracts the combination of S2 and S7, the combination of S2 and S9, the combination of S2 and S10, the combination of S7 and S9, the combination of S7 and S10, and the combination of S9 and S10, that is, extracts six combinations (4C2=6), as the merging process candidates. The merging process candidates extracted in this step are combinations of two difference rectangles that can be merged into a new difference rectangle by the merging process described below.

Six merging process candidates are thus extracted for a no-difference block for which four adjacent difference rectangle numbers are detected.

As described above, the printer driver execution unit 45*b* selects the no-difference blocks for which two or more adjacent difference rectangle numbers are detected sequentially one at a time and extracts the merging process candidates of the no-difference blocks. Plural merging process candidates related to the same combination of difference rectangle numbers may be extracted, but there is only one merging process candidate in this example.

As a result, one or plural merging process candidates are extracted by the merging process candidate extraction process.

Next, the printer driver execution unit 45*b* extracts a reference processing time value (step SD9).

The reference processing time is the printer processing time value when a difference rectangle is sent to the printer 5 without executing the merging process described below.

The printer processing time value is a value indicating the length of time needed for processing when the printer 5 executes a printing process (described below) based on the difference rectangles received from the host computer 1. The greater the printer processing time value, the longer the time required for processing.

The printer processing time value can be obtained from the following equation.

printer processing time value=(coefficient $K1$×(number of difference rectangles))+(coefficient $K2$×(total area of difference rectangles))

Note that the total area of the difference rectangles is the total number of blocks in the difference rectangles.

As described below in further detail, the printer control unit 27 of the printer 5 renders the difference rectangles over the stored image data GD3 in the image buffer, and prints based on the data rendered in the image buffer. The processing time required by this process varies according to the number of difference rectangles and the total area of the difference rectangles. By calculating the printer processing time value from the above equation, the value of the printer processing time value can be made to reflect the number of difference rectangles and the total area of the difference rectangles. Note that coefficient K1 and coefficient K2 are previously set based on tests or simulations so that the number of difference rectangles and total area of the difference rectangles are appropriately reflected in the printer processing time value based on such processing characteristics as the specifications of processor resources, such as the CPU and memory used in the printer 5, the processing method, and differences between individual devices.

As described above, FIG. 16(B) shows an example of the difference rectangles before the merging process is executed. In this example, the printer driver execution unit 45*b* obtains the reference processing time value based on the state of the difference rectangles shown in FIG. 16(B). In the example shown in FIG. 16(B), the number of difference rectangles is 16, and the area of the difference rectangles is 31. If coefficient K1=2, and coefficient K2=1, the reference processing time value is [2 (coefficient K1)×16 (number of difference rectangles)+1 (coefficient K2)×31 (total area of the difference rectangles)=63].

As shown in FIG. 15, after calculating the reference processing time value, the printer driver execution unit 45*b* calculates the printer processing time value when the merging process is applied, and calculates the difference of the printer processing time value minus the reference processing time value (referred to below as the "reference difference"), for each merging process candidate extracted in step SD8 (step SD10).

FIG. 18 is used to describe the process performed in step SD10.

FIG. 18 illustrates the relationship between the merging process candidates extracted based on the process target image data GD1 shown in FIG. 16(B), the printer processing time value of each merging process candidate, and the reference difference.

In the following description referring to FIG. 18, coefficient K1=2 and coefficient K2=1.

In this example as shown in FIG. 18, plural merging process candidates are extracted. The first candidate shown in FIG. 18 is a merging process candidate for the combination of difference rectangle number S4 and difference rectangle number S6. When the difference rectangle of difference rectangle number S4 and the difference rectangle of difference rectangle number S6 are combined by the merging process, the result is a new difference rectangle GG2 as shown in FIG. 16(B). The total number of difference rectangles after difference rectangles are combined to create the new difference rectangle GG2 as shown in FIG. 16(B) is 14 (the number of new difference rectangles GG2=1, and the number of existing difference rectangles=13). The total area of the difference rectangles is 33. As a result, the printer driver execution unit 45*b* calculates the printer processing time value of the first candidate to be 61. More specifically, [2 (coefficient K1)×14 (number of difference rectangles)+1 (coefficient K2)×33 (total area of the difference rectangles) =61].

The printer driver execution unit 45*b* also calculates the reference difference of the first candidate to be −2 (printer processing time value−reference processing time value=61−63=−2).

The printer driver execution unit 45*b* thus calculates the printer processing time value and reference difference based on executing the merging process and creating new difference rectangles for each merging process candidate extracted in step SD8.

Next, the printer driver execution unit 45*b* executes the merging process as described below sequentially from the lowest reference difference for each merging process candidate having a negative reference difference (merging process candidates for which the printer processing time value is lower than the reference processing time value) (step SD11).

In the example shown in FIG. 18, the first to ninth candidates have a negative reference difference and are objects processed in the merging process. The merging process is not applied to the tenth and later merging process candidates that do not have a negative reference difference.

The merging process candidates with a negative reference difference are selected for processing in the merging process for the following reason. Specifically, that the reference difference of a merging process candidate is negative means that the processing time of the printer 5 is shorter when the merging process is applied to that merging process candidate than when the merging process is not applied.

In the example shown in FIG. 18, the printer driver execution unit 45*b* first executes the merging process based on the first merging process candidate in step SD11.

FIG. 19(A) illustrates the process target image data GD1 after the merging process is executed based on the first merging process candidate. As shown in FIG. 19(A), the printer driver execution unit 45*b* combines the difference rectangle of difference rectangle number S4 and the difference rectangle of difference rectangle number S6 by the merging process, and generates a new difference rectangle containing the blocks of block numbers R19, R20, R29, R30, R39, R40. As described above, the merging process is a process that creates a new difference rectangle, which is the smallest rectangle of image data containing two difference rectangles.

Next, the printer driver execution unit 45*b* assigns a unique difference rectangle number to the newly created difference rectangle. In the example shown in FIG. 19(A), the difference rectangle number S17 is assigned to the new difference rectangle.

As a result of the above process based on the first candidate, the difference rectangles of difference rectangle numbers S4, S5, and S6 cease to exist as shown in FIG. 19(A). The printer driver execution unit 45*b* therefore eliminates the merging process candidates that involve merging with the difference rectangles of difference rectangle numbers S4, S5 and S6 from the group of merging process candidates that have not been processed. In the example shown in FIG. 18, the printer driver execution unit 45*b* therefore eliminates the second candidate, third candidate, fourth candidate, and fifth candidate from the difference rectangles to be processed.

Next, the printer driver execution unit 45*b* executes the merging process based on the sixth candidate, which was not eliminated from the candidates to process.

As described above, the printer driver execution unit 45*b* applies the merging process sequentially in order from the smallest reference difference to the merging process candidates with a negative reference difference (merging process candidates for which the printer processing time value is less than the reference processing time value).

FIG. 19(B) shows the process target image data GD1 after the merging process based on the merging process candidates shown in FIG. 18 ends.

As shown in FIG. 19(B), new difference rectangles of difference rectangle numbers S17, S18, S19, S20, and S21 are created as a result of the merging process based on the merging process candidates shown in FIG. 18.

After executing the merging process in step SD11, the printer driver execution unit 45*b* extracts merging process candidates as described in steps SD4 to SD8 based on the difference rectangles after running the merging process (step SD12). In this example, the printer driver execution unit 45*b* calculates the merging process candidates based on the difference rectangles shown in FIG. 19(B).

Next, the printer driver execution unit 45*b* calculates the reference processing time value following the process described in step SD9.

Next, the printer driver execution unit 45*b* calculates the printer processing time value and the reference difference for each extracted merging process candidate following the process described in step SD10 (step SD14).

Next, the printer driver execution unit 45*b* determines if there is a merging process candidate with a negative reference difference (step SD15).

If there is a merging process candidate with a negative reference difference (step SD15 returns YES), the printer driver execution unit 45*b* returns the process to step SD11, and executes the merging process based on the appropriate merging process candidates.

The printer driver execution unit 45*b* thus repeats detecting merging process candidates and running the merging process based on the merging process candidates with a negative reference difference until there are no merging process candidates with a negative reference difference.

If there is not a merging process candidate with a negative reference difference (step SD15 returns NO), the printer driver execution unit 45*b* goes to step SD16 because the processing time of the printer 5 cannot be further reduced by executing the merging process.

In step SD16, the printer driver execution unit 45*b* compresses each of the final difference rectangles using a specific compression method, and stores the compressed difference rectangles relationally to location information indicating the position of each difference rectangle in a specific storage area (step SD16).

This completes the block compression process.

When the final state of the difference rectangles is as shown in FIG. 19(B), the printer driver execution unit 45*b* includes the combination of compressed data and the location information indicating the position of the difference rectangle for the difference rectangles of difference rectangle numbers S1, S2, S3, S7, S9, S17, S18, S19, S20, S21 in the control data.

As described above, the printing system 8 according to this embodiment of the invention has a host computer 1 (control device) and an inkjet printer 5 (printing device). The host computer 1 has a host control unit 45 that compares blocks formed by segmenting process target image data, which is image data to process, and blocks formed by segmenting comparison image data, which is image data used for comparison; identifies blocks of the process target image data containing different data as difference blocks; generates difference rectangles that are rectangles containing one or plural difference blocks; and sends the generated difference rectangles to the printer 5. When generating the difference rectangles, the host control unit 45 decides the method of generating the difference rectangles based on the number of difference rectangles and the total area of the difference rectangles.

The inkjet printer 5 has an inkjet line head 12 (print unit), a printer storage unit 50 (device storage unit) that stores comparison image data; and a printer control unit 27 (device control unit) that controls the inkjet line head 12 to print based on the comparison image data stored by the printer storage unit 50 and the difference rectangles received from the host computer 1.

Because difference rectangles are sent from the host computer 1 to the inkjet printer 5 in this configuration, the amount of data that is transmitted can be reduced. Furthermore, when creating the difference rectangles, increase in the processing load of the inkjet printer 5 because the difference rectangles are generated by a method based on the number of difference rectangles and the total area of the difference rectangles, which affect the processing time of the inkjet printer 5.

The host control unit 45 of the host computer 1 in this embodiment of the invention also determines the method of generating the difference rectangles based on the number of difference rectangles, and total area of the difference rectangles, and the processing characteristics of the inkjet printer 5.

Because this configuration creates the difference rectangles using a method based on the processing characteristics of the inkjet printer 5 that affect the processing time of the inkjet printer 5, increase in the processing load of the inkjet printer 5 more effectively.

The host control unit 45 of the host computer 1 in this embodiment of the invention compresses the difference rectangles for transmission to the printer 5. The printer control unit 27 of the printer 5 then decompresses the difference rectangles.

Because the difference rectangles are compressed for transmission in this configuration, the amount of data transmitted by the host computer 1 can be reduced more effectively.

Some embodiments of the invention is described above with reference to a preferred embodiment thereof, but the invention is not limited thereto and can be modified and adapted in many ways without departing from the scope of the accompanying claims.

The host computer 1 and printer 5 are configured in the above embodiment to cumulatively store print image data based on the image data of the images printed continuously to multiple labels S. However, a configuration in which each device previously stores specific image data as the comparison image data is also conceivable.

The foregoing embodiment describes a configuration in which the printer 5 stores the post-superimposition image data GD4 as the comparison image data. Alternatively, a configuration in which the inkjet printer 5 stores the image data of the blocks contained in the control data as the comparison image data is also conceivable.

Yet further, the application execution unit 45a is configured to generate the print image data in the foregoing embodiment, but a configuration in which the printer driver execution unit 45b generates the print image data is also conceivable.

A configuration in which the processes described in the foregoing embodiment are executed in a specific operating mode is also conceivable.

The foregoing embodiments are described using an inkjet printer as an example, but the configuration of the printer 5 is not so limited and the invention can obviously also be applied to dot impact printers, thermal printers, and laser printers, for example. The receiver device is also not limited to the printer 5, and the invention can also be applied to other systems in which a host computer 1 sends image data to a projector or display device that displays images, for example.

The function blocks shown in FIG. 1 can be achieved by the cooperation of hardware and software, and do not suggest a specific hardware configuration. Functions of the host computer 1 and printer 5 may also be rendered by other devices externally connected thereto. The host computer 1 and printer 5 may also operate as described above by running programs stored on an externally connected storage medium.

The invention being thus described, it will be apparent that it may be varied in many ways. Such variations are not to be regarded as a departure from the spirit and scope of the disclosure, and all such modifications as would be apparent to one skilled in the art are intended to be included within the scope of the following claims.

What is claimed is:

1. An image processing device comprising:
  a controller that calculates a value for each of a plurality of blocks of comparison image data and a value for each of a plurality of blocks of print image data, the calculated values being computed using a specific equation; and
  a storage that stores identification information identifying tile comparison image data relationally to the calculated values:
  wherein the controller compares the calculated values of the blocks in the print image data with the calculated values of the blocks in the comparison image data, and selects comparison image data with the fewest blocks having different calculated values, and
  wherein the controller sends each block in the print image data having a calculated value different from the calculated value of the corresponding block in the selected comparison image data and the identification information for the selected comparison image data to a printing device.

2. The image processing device described in claim 1, wherein:
  the storage stores the calculated values.

3. The image processing device described in claim 2, wherein:
  the controller compresses the image data to be sent to the printing device.

4. The image processing device described in claim 1, wherein:
  the controller identifies a block of the print image data containing data content different from the corresponding block of comparison image data as a difference block;
  generates difference rectangles of rectangles including one or a plurality of difference blocks, and when generating the difference rectangles determines the method of forming the difference rectangles based on the number of difference rectangles and the total area of the difference rectangles; and
  sends the generated difference rectangles to the printing device.

5. A control method of an image processing device, comprising:
  calculating a value, for each of a plurality of blocks of comparison image data and a value for each of a plurality of blocks of print image data, the calculated values being computed using a specific equation;
  storing identification information identifying the comparison image data relationally to the calculated values;
  comparing the calculated values of the blocks in the print image data with the calculated values of the blocks in the comparison image data, and selecting comparison image data with the fewest blocks having different calculated values; and
  outputting the image data of each block the print image data having a calculated value different from the calculated value of the corresponding block in the selected comparison image data and the identification information for the selected comparison image data to a printing device.

6. An image processing device comprising:
a controller configured to:
  calculate a first value for a first block in print image data by computing a specific equation, and
  acquire a second value for a second block in comparison image data, the second block corresponding to the first block, the second value having been calculated by computing the specific equation; and
a storage configured to store identification information identifying the comparison image data relationally to the calculated values of the blocks of the comparison image data respectively; wherein:
  the controller compares the calculated values of the blocks in print image data with the calculated values of the blocks in comparison image data, selects comparison image data with the fewest blocks having different calculated values, and compares the first value and the second value of the second block of the selected comparison image data; and
  when it is determined that the first value and the second value are different, the controller sends the control data to the printing device, the control data including the image data of the first block, location information indicating a location of the first block, and the identification information for the selected comparison image data.

7. The image processing device described in claim 6, wherein:
the controller is configured to compress the image data; and
the control data includes the compressed image data.

* * * * *